Figure 1:
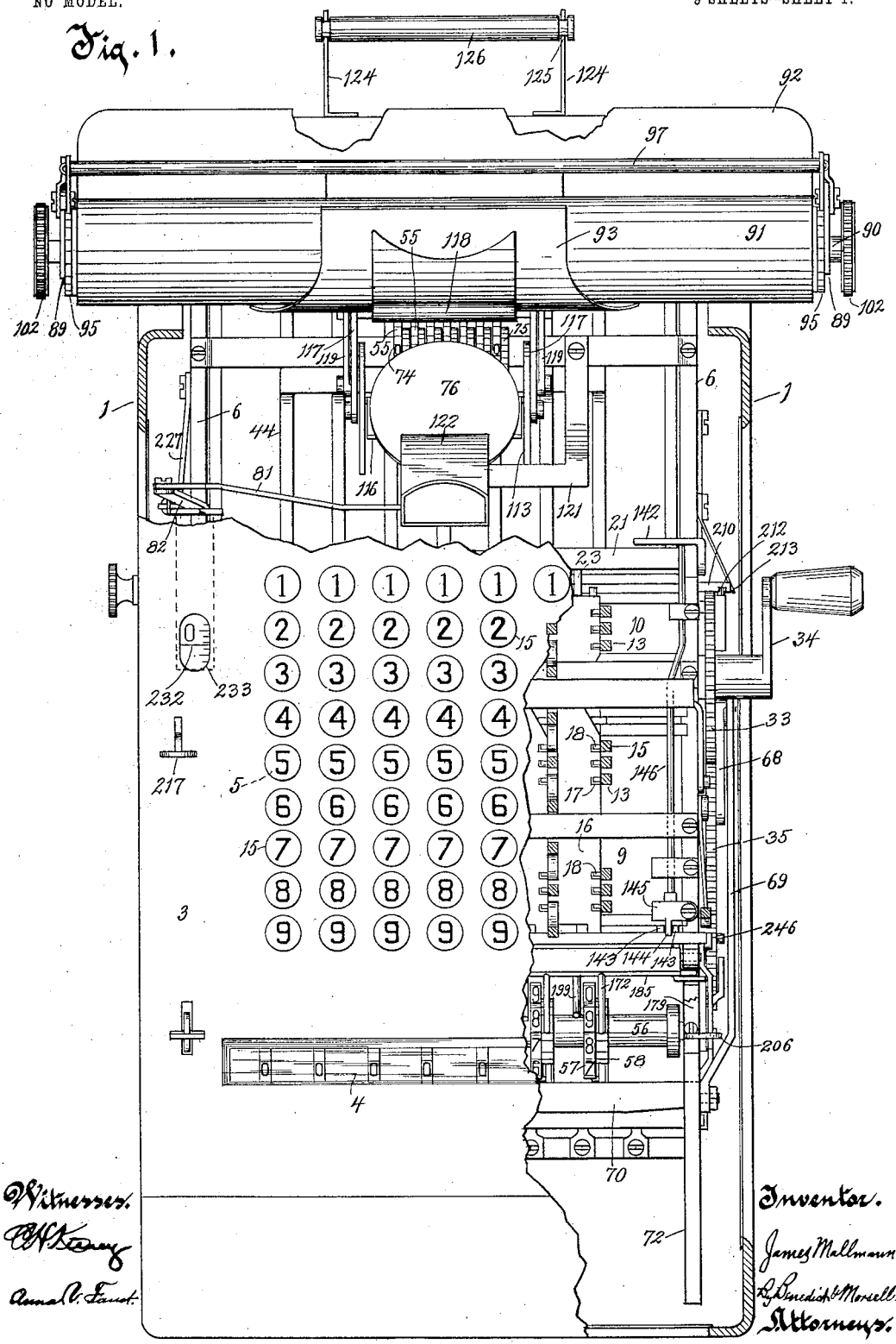

No. 745,024. PATENTED NOV. 24, 1903.
J. MALLMANN.
CALCULATING MACHINE.
APPLICATION FILED APR. 7, 1902.
NO MODEL. 9 SHEETS—SHEET 1.

No. 745,024. PATENTED NOV. 24, 1903.
J. MALLMANN.
CALCULATING MACHINE.
APPLICATION FILED APR. 7, 1902.
NO MODEL. 9 SHEETS—SHEET 2.

Witnesses.
O. H. Keeney
Anna C. Faust

Inventor.
James Mallmann
By Benedict & Morsell
Attorneys.

No. 745,024. PATENTED NOV. 24, 1903.
J. MALLMANN.
CALCULATING MACHINE.
APPLICATION FILED APR. 7, 1902.
NO MODEL. 9 SHEETS—SHEET 3.

Witnesses.
Inventor.
James Mallmann
By Benedict & Morsell
Attorneys.

No. 745,024. PATENTED NOV. 24, 1903.
J. MALLMANN.
CALCULATING MACHINE.
APPLICATION FILED APR. 7, 1902.
NO MODEL. 9 SHEETS—SHEET 6.

Witnesses.
Inventor.
James Mallmann
By Benedict & Morsell
Attorneys.

No. 745,024. PATENTED NOV. 24, 1903.
J. MALLMANN.
CALCULATING MACHINE.
APPLICATION FILED APR. 7, 1902.
NO MODEL. 9 SHEETS—SHEET 7.
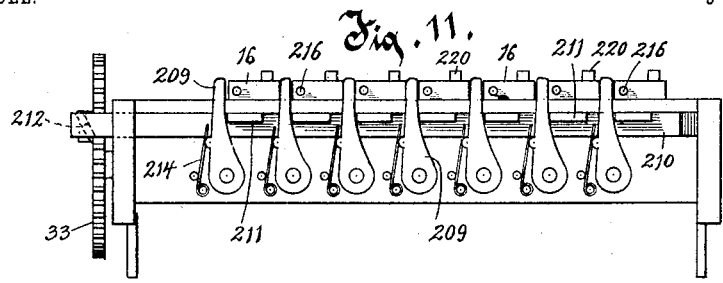
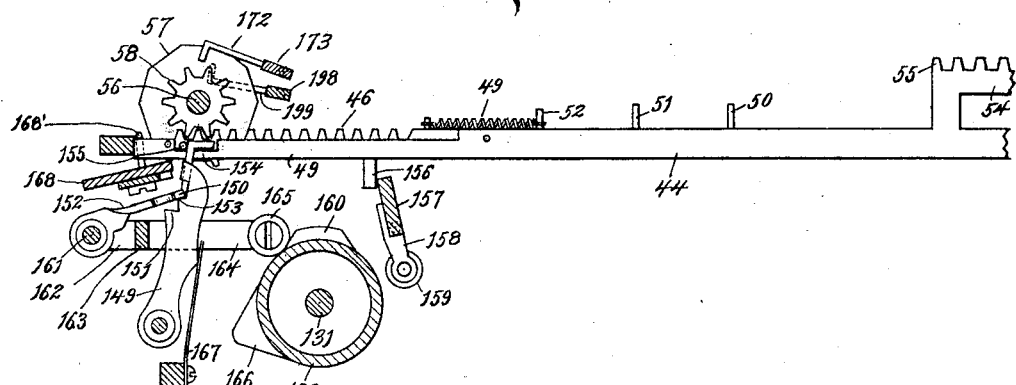
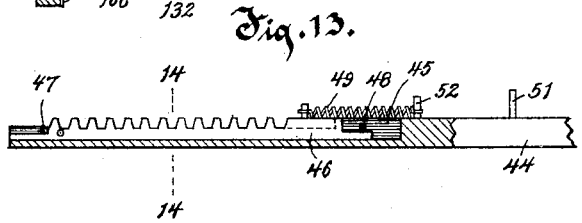
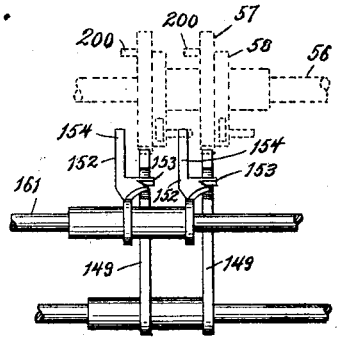

No. 745,024. PATENTED NOV. 24, 1903.
J. MALLMANN.
CALCULATING MACHINE.
APPLICATION FILED APR. 7, 1902.
NO MODEL. 9 SHEETS—SHEET 8.
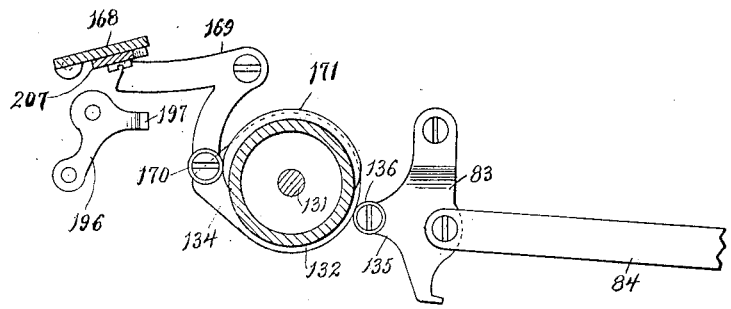
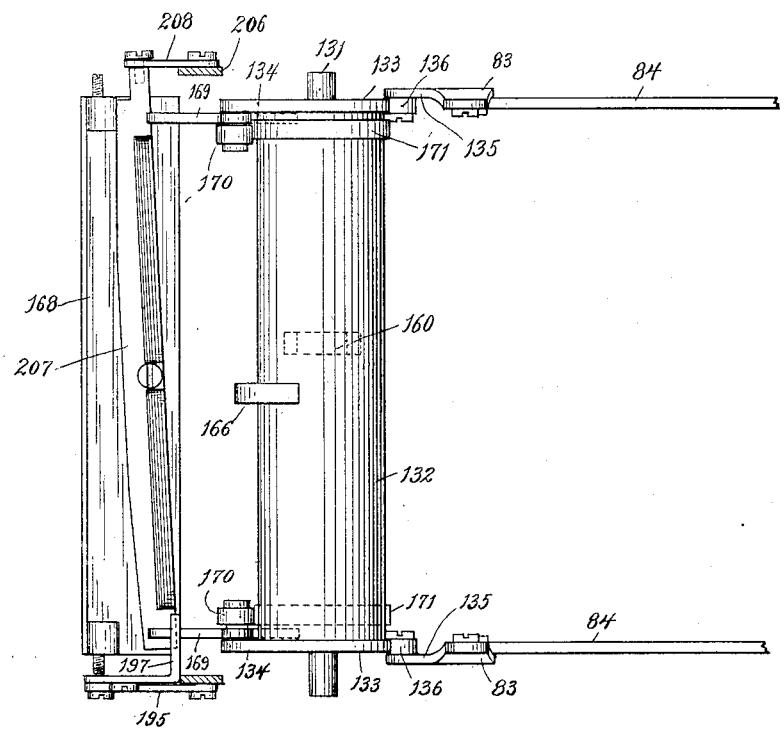
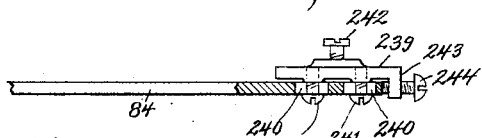
Witnesses. Inventor.
James Mallmann
By Benedict & Morsell
Attorneys.

No. 745,024. PATENTED NOV. 24, 1903.
J. MALLMANN.
CALCULATING MACHINE.
APPLICATION FILED APR. 7, 1902.
NO MODEL. 9 SHEETS—SHEET 9.

Witnesses. Inventor.
James Mallmann
By Benedict & Morsell
Attorneys.

No. 745,024. Patented November 24, 1903.

UNITED STATES PATENT OFFICE.

JAMES MALLMANN, OF SHEBOYGAN, WISCONSIN.

CALCULATING-MACHINE.

SPECIFICATION forming part of Letters Patent No. 745,024, dated November 24, 1903.

Application filed April 7, 1902. Serial No. 101,631. (No model.)

*To all whom it may concern:*

Be it known that I, JAMES MALLMANN, residing at Sheboygan, in the county of Sheboygan and State of Wisconsin, have invented a new and useful Improvement in Calculating-Machines, of which the following is a description, reference being had to the accompanying drawings, which are a part of this specification.

My invention has relation to improvements in calculating-machines, more particularly to certain improvements upon the machine covered in United States Letters Patent issued to me on August 13, 1901, No. 680,341.

One of the objects of the present invention is to provide means for setting the machine for writing and retaining the total of the numbers added or calculated.

A further object is to provide improved means for setting the machine to writing total and returning calculating-wheels to zero.

A further object is to provide means whereby when it is desired to operate upon the same number a plurality of times it is only necessary to depress the operating-keys relating to said number once.

A further object is the provision of improved printing mechanism.

A further object is the provision of improved inking mechanism.

A further object is the provision of improved means for carrying over from one calculating-wheel to another, and a still further object is the provision of improved gong mechanism used in connection with the repeating mechanism.

With the above primary and other incidental objects in view the invention consists of the devices and parts or their equivalents, as hereinafter set forth.

Figure 2:
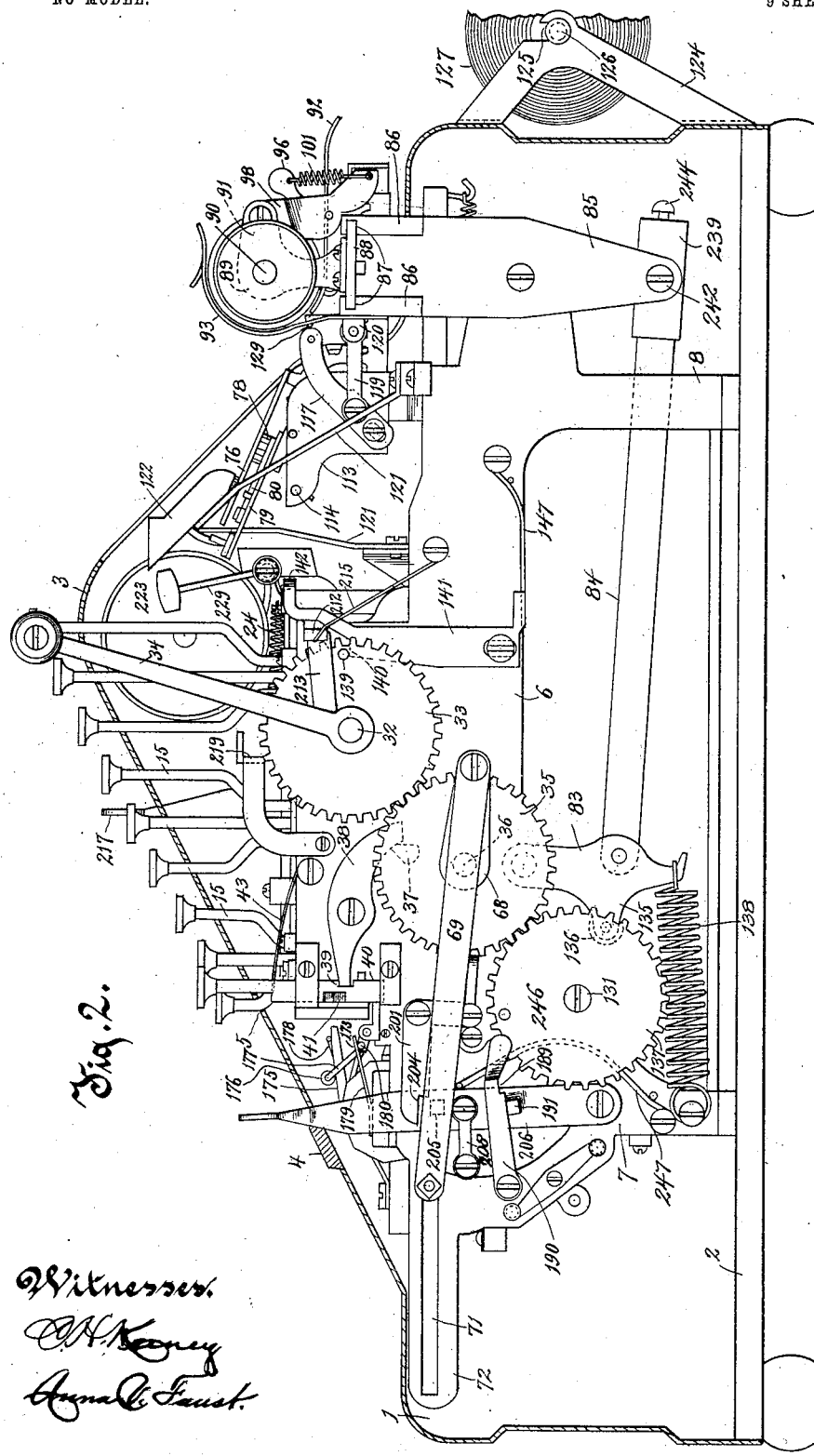
Figure 3:
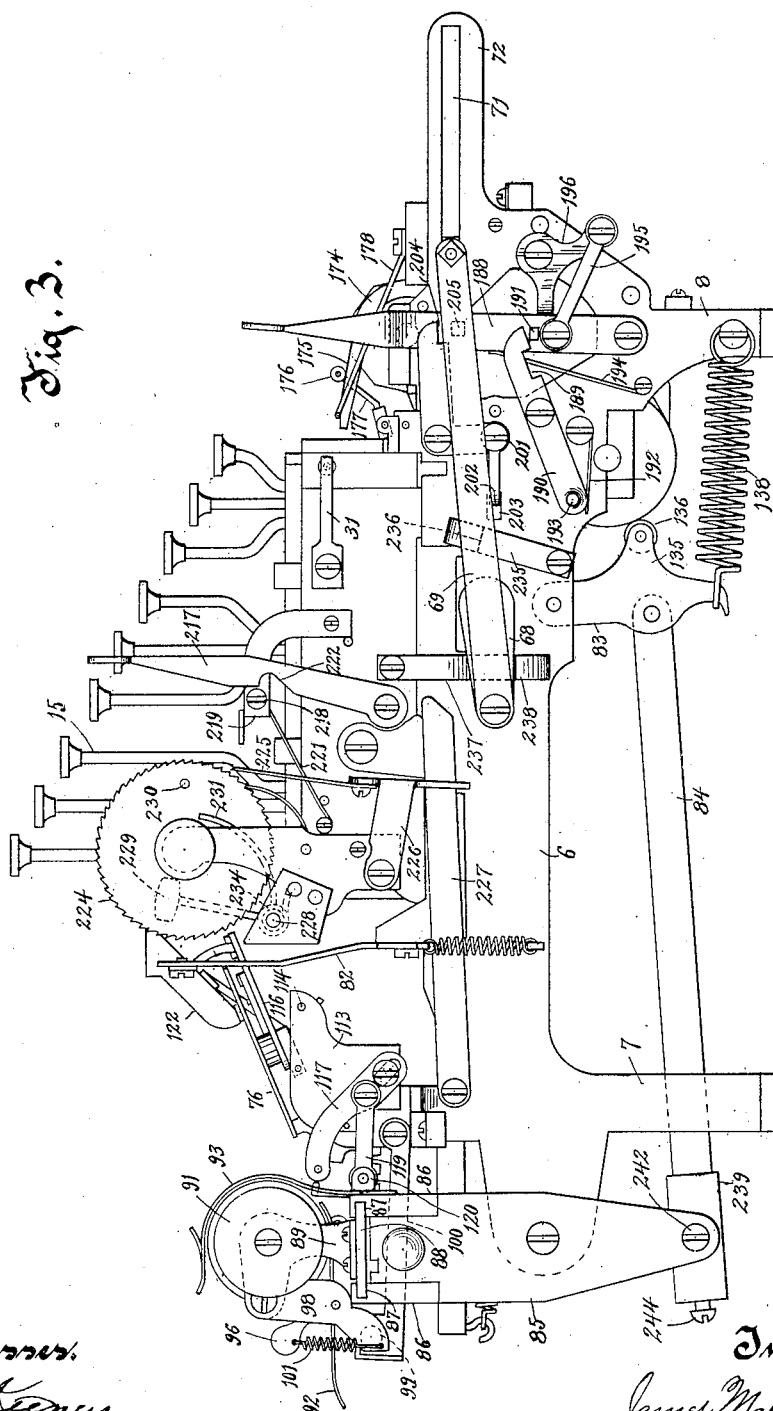
Figure 4:
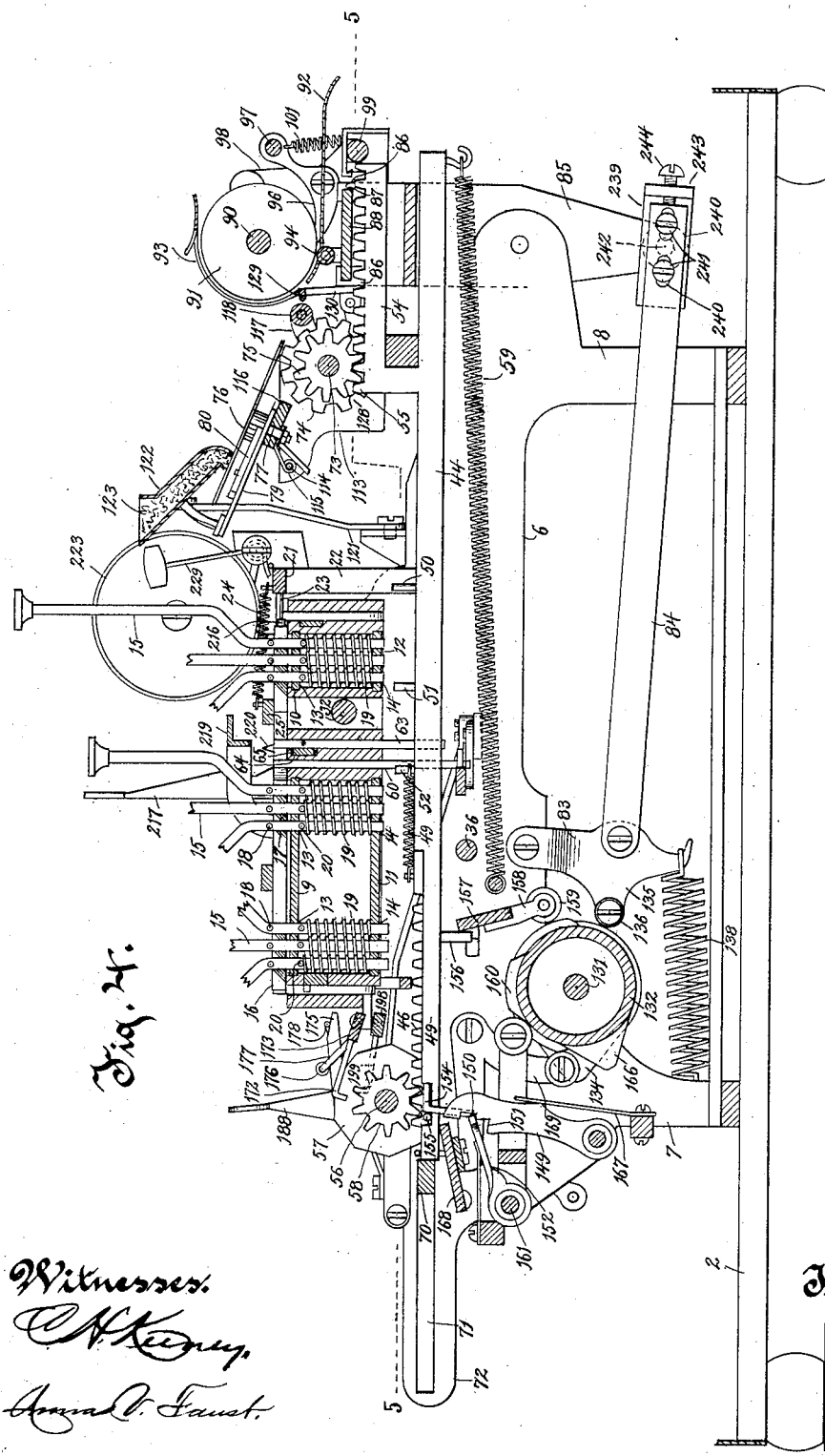
Figure 5:
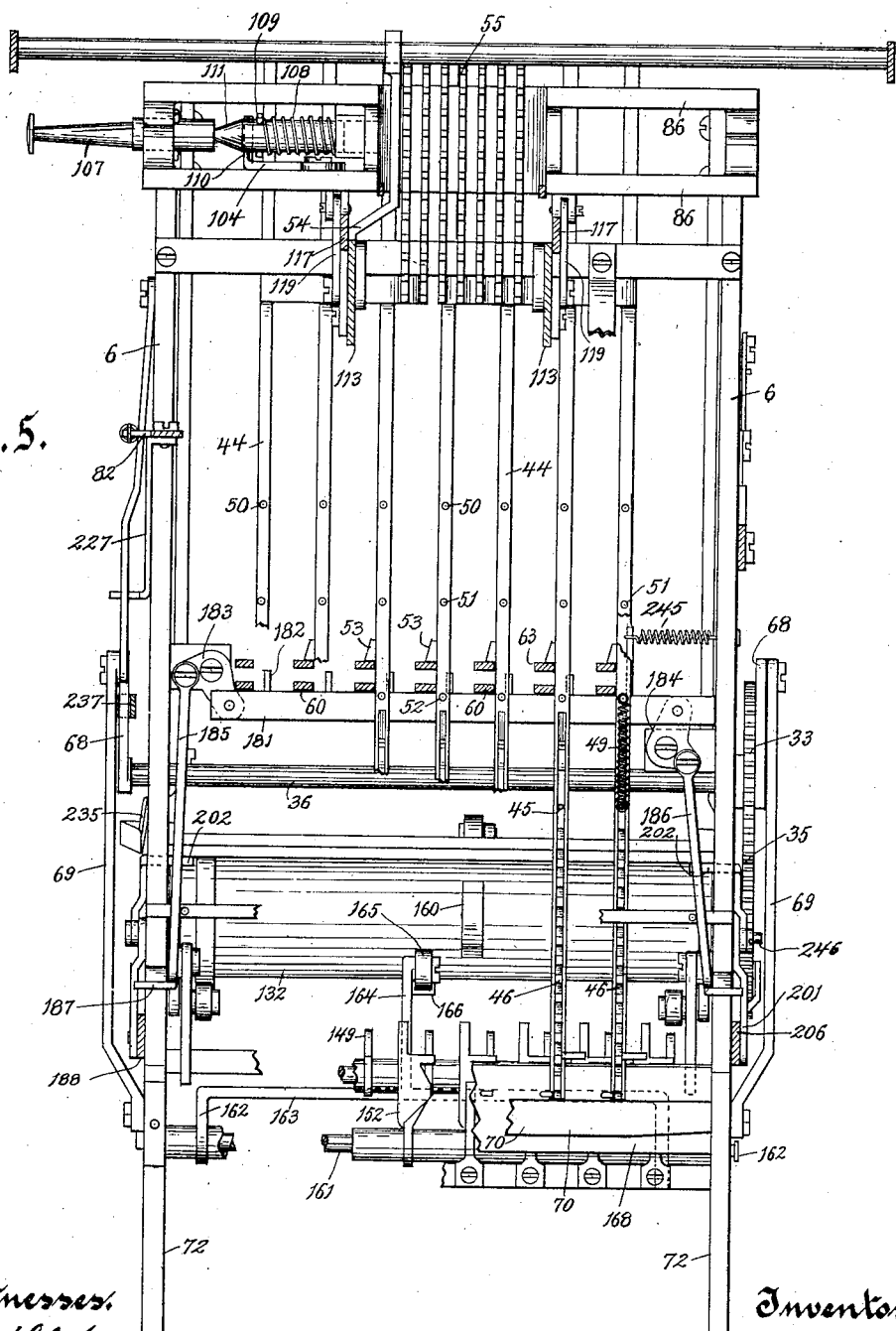
Figure 6:
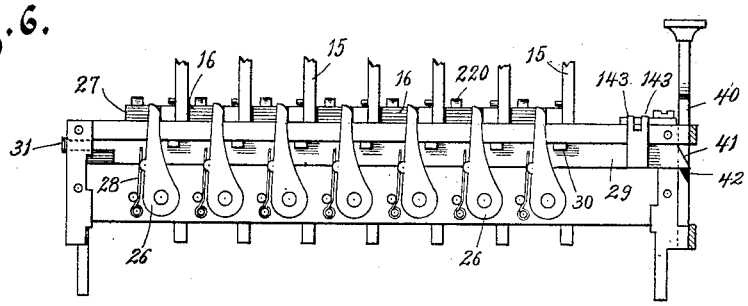
Figure 7:
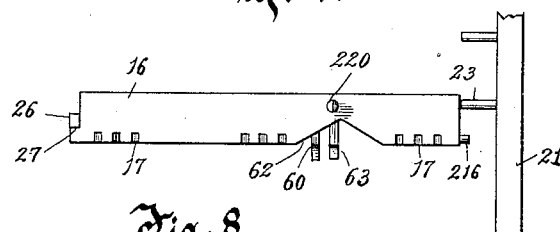
Figure 8:
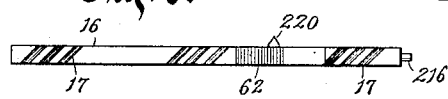
Figure 9:
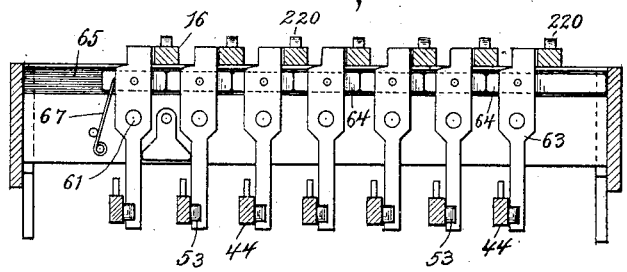
Figure 10:
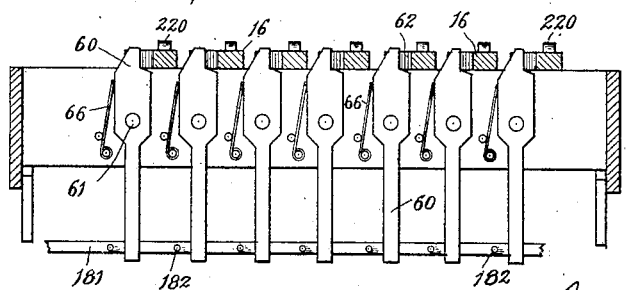
Figure 20:
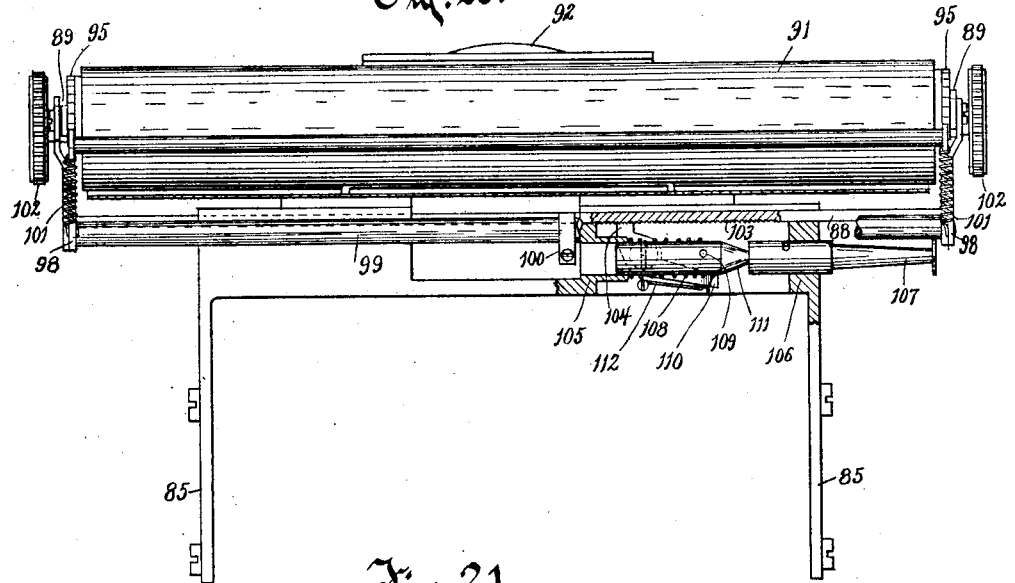
Figure 21:
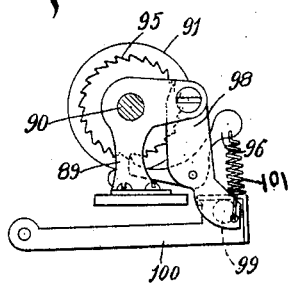
Figure 22:
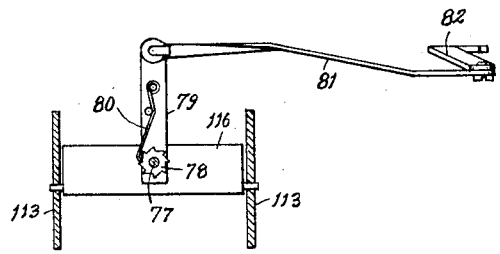

In the accompanying drawings, Figure 1 is a plan view of the machine, parts broken away and in section. Fig. 2 is a side elevation with the casing in section. Fig. 3 is a side elevation of the mechanism, showing the opposite side to that shown in Fig. 2, said mechanism being removed from the casing. Fig. 4 is a side elevation of the mechanism, parts in section and parts broken away, and showing only the base of the casing. Fig. 5 is a horizontal section on the line 5 5 of Fig. 4. Fig. 6 is a front view of the keyboard, showing the operating-keys partly broken away. Fig. 7 is a plan view of one of the slidable bars. Fig. 8 is an edge view of Fig. 7. Fig. 9 is a transverse section through the slidable bars and mechanism adjacent thereto and showing in full lines the zero-arms. Fig. 10 is a similar view to Fig. 9, showing in full line the stop-arms. Fig. 11 is a rear view of the keyboard with the rear plate of said board removed in order to show the rear pawls 209. Fig. 12 is a view of one of the longitudinal actuating-bars and allied mechanism. Fig. 13 is a detail fragmentary view of one of the longitudinal actuating - bars, parts broken away. Fig. 14 is a cross-section on the line 14 14 of Fig. 13. Fig. 15 is a detail view of the calculating mechanism. Fig. 16 is a side view of parts shown in Fig. 15. Fig. 17 is a detail view of the cam-roller and allied mechanism. Fig. 18 is an inverted plan view of Fig. 17. Fig. 19 is a plan view of the rear portion of one of the arms shown in Fig. 18, parts broken away. Fig. 20 is a rear view of the paper-carrying roller and adjacent mechanism, parts broken away. Fig. 21 is an end view of Fig. 20 with the shaft in section and parts removed, and Fig. 22 is a detail of parts of the inking mechanism.

The casing of the machine may be of any desirable construction best adapted for inclosing the operative parts; but I prefer to employ a casing of the general form of construction shown in the accompanying drawings and best illustrated in Figs. 1 and 2, said casing consisting of similar side pieces 1 1, a bottom piece 2, and top piece 3. The forward upwardly-slanting portion of the top piece is provided with an elongated sight-opening 4, which may be covered by some suitable transparent material, such as glass. Above the sight-opening 4 the said upwardly-slanting portion of the top of the casing is provided with a series of key-openings 5.

The frame for supporting the operative parts of the machine and which frame is arranged within the casing may be of any desirable construction; but I prefer to employ the form herein shown, which consists generally of two similar side pieces 6 6, provided with front and rear depending legs 7 and 8, respectively, connected by suitable brace-bars. Upon this frame is mounted the entire operating mechanism of the machine. The casing is capable of being removed and entirely separated from said operating parts.

About medially of the framework of the machine is arranged a keyboard consisting of a suitable frame. The principal parts of this frame are the front and rear upper horizontal plates 9 and 10, respectively, and the lower front and rear horizontal plates 11 and 12, respectively. (See Fig. 4.) These upper and lower plates are provided with alined openings 13 and 14, respectively. Extending through these alined openings are operating-keys 15. It will be understood that the openings are arranged in a series of lines, preferably nine. The operating-keys extend upwardly above the upper plates 9 and 10 and through the key-openings 5 in the inclined forward portion of the casing, the upper extremities of said keys being provided with buttons for convenience in depressing said keys and also for conveniently displaying the designations of the keys. By this arrangement the keys are necessarily disposed in a series of lines, with the keys in each line in a step-by-step relation, the height of the keys gradually increasing toward the upper portion of the inclined front portion of the top of said casing. The designations on the buttons of the keys are numerals running consecutively from "1" to "9," the rear keys of each line being numbered "1" and the numbers increasing consecutively toward the front. It is obvious that any desired number of lines of keys may be employed.

Upon the upper plates 9 and 10 of the keyboard are a series of slidable bars 16, there being one of said bars for each line of keys. One of these bars is shown in detail in Figs. 7 and 8. Each bar is formed on one edge with a series of diagonal slots 17, the number of said slots corresponding to the number of keys in each line. Each key is provided with a laterally-extending pin 18, which is normally in line with the upper end of the slot 17 relating thereto. Below the plates 9 and 10 each key is encircled by a coiled spring 19, the said springs being confined between the lower plates 11 and 12 and pins 20 intersecting the keys. The function of these springs is to normally hold the keys up.

The numeral 21 indicates a transverse bar, said bar having its ends bent downwardly to form depending legs 22, the extremities of said legs being pivoted to the side pieces of the frame. The front edge of the bar 21 is provided with a series of projecting fingers 23, which correspond in number to the number of slidable bars employed, and each finger is adapted to act against the rear end edge of the slidable bars relating thereto, being held in such position by means of a spring acting against the bar 21. I prefer to employ for this purpose a coiled spring 24, said spring having its rear end connected to the bar 21 and its forward end connected to a transverse fixed bar 25, as clearly shown in Fig. 4.

When the slidable bars 16 are moved rearwardly in the manner hereinafter explained, mechanism is necessary to hold said bars in their rearwardly-adjusted position a sufficient length of time to permit certain operations to take place. For the purpose of holding said bars in their rearwardly-adjusted positions I provide at the front of the keyboard a series of levers 26, (see Fig. 6,) each lever being pivoted at its lower end and having its upper end normally engaging a notch 27 (see Fig. 7) at one corner of the forward end of the slidable bar. A spring 28 bears against the edge of each lever 26. Now the moment a slidable bar is moved rearwardly the spring 28 as soon as the forward end of the slidable bar escapes the lever 26 will cause said lever to turn on its pivot in a direction to throw the upper end of the lever in front of the forward unnotched portion of the front end of the slidable bar, and hence hold said bar in its rearwardly-thrust position. Of course at a certain period of the operation of the machine it becomes necessary that the slidable bars which have been thrust rearwardly and held in such position should be returned to their normal forward positions, and to accomplish this I prefer to provide a transverse lever-actuating bar 29, provided with a series of projecting lugs 30, said lugs corresponding in number to the number of levers 26 employed. The bar 29 is normally held in the position shown in Fig. 6 by means of a spring 31 pressing against one end thereof. It is obvious that by moving the bar 29 toward the left with respect to Fig. 6 the several lugs 30 will contact with the levers 26, and consequently turn said levers so that their upper ends will be turned out of engagement with the forward ends of the slidable bars, and the moment this occurs said slidable bars will be thrown forwardly by the action of the springs 19, which move the operating-keys upwardly. At this time the action of the mechanism on the transverse lever-actuating bar 26 ceases, and hence the spring 31 returns said bar to its normal position, and the lugs 30 are thereby brought away from the levers 26, and hence the springs 28 are free to turn said levers back to normal position, or with their upper ends engaging the notches 27 of the slidable bars.

Any desirable mechanism may be employed for moving the lever-actuating bar 29 in a direction to cause the lugs 30 to contact with the levers 26. I prefer, however, to employ the specific mechanisms now about to be explained.

Mounted on one end of a main shaft 32 is a toothed wheel 33, (see Figs. 1, 2, and 3,) and on the outer extremity of said shaft is a crank-handle 34. The toothed wheel 33 is in mesh with a similar wheel 35, mounted on one end of another transverse shaft 36. On the inner side of the wheel 35 is a projecting lug 37. Suitably pivoted at a medial point to the framework is a lever 38. This lever is so disposed that the lug 37 will contact therewith only at a time when the toothed wheel 35 has almost completed its revolution. The lug will then contact with the rear end of the lever. The forward end of said lever engages with the notch 39, formed in the rear edge of a vertical rod 40. This rod is movable in suitable guideways and is provided on its front edge with a beveled notch 41, which is adapted to engage with the beveled end edge 42 of the lever-actuating bar 29. It is obvious from this construction that when the toothed wheel 35 has almost completed its revolution the lug 37 will be brought into engagement with the rear end of the lever 38, and said lever will thereby be turned on its pivot in a direction to cause the forward end of the lever through its engagement with the rod 40 to act on said rod in a direction to force the same downwardly. This down movement of the rod 40 will, through the engagement of the bevels 41 and 42, cause a longitudinal movement of the lever-actuating bar 29, and this movement of said bar will cause the projecting lugs 30 thereof to act against the levers 26, and hence thereby provide for the return movement of the slidable bars 16 in the manner hereinbefore fully pointed out. The moment the lug 37 escapes the end of the lever 38 upon the completion of the turning of the wheel 35 said lever is free to return to its former position, and the rod 40 is then forced upwardly to its normal position by means of the action of a spring 43 thereagainst. The rod 40 in thus moving upwardly permits the spring 31 to return the lever-actuating bar 29 to its normal position. It will be noticed that the rod 40 is continued upwardly and provided upon its upper end with a finger-button. This permits of the rod being depressed by finger-pressure thereon independent of the operation of the lever 38, for the purpose hereinafter to be stated.

It will be noticed from Fig. 4 that the keys are arranged in three sets, there being three keys in each line in each set. This is to prevent crowding of the buttons at the upper ends of the keys too close together, and thereby permitting said keys to be spread apart a desired distance and larger buttons provided at the upper ends thereof. By arranging the keys in sets, as described, it is of course necessary that the diagonal slots 17 of the slidable bars 16 should be correspondingly arranged, as clearly shown in Figs. 7 and 8.

Below the lower ends of the operating-keys are a series of longitudinal actuating-bars 44, which are adapted to slide in suitable guideways in the framework. Each of these bars is provided at its forward end and in its upper edge with a longitudinal recess 45, (see Fig. 13,) in which is seated a movable rack-bar 46. (See also Fig. 13.) The teeth of each rack-bar are on the upper edge thereof, and there are preferably thirteen of said teeth. The movement of this rack-bar forwardly is limited by contact with a pin 47, and its movement rearwardly is limited by contact with a pin 48. Connected at its forward end to each rack-bar is a coiled spring 49, the rear end of each spring being connected to the longitudinal actuating-bar relating thereto. Each of these coiled springs serves to hold the rack-bar to which it is connected at the limit of the movement of said rack-bar rearwardly as governed by contact thereof against the pin 48. Projecting upwardly from each longitudinal actuating-bar are a series of stop-pins, the number of said pins corresponding to the number of sets or divisions in which the operating-keys are divided, three of said pins being therefore employed. The rear pin is indicated by the numeral 50, the intermediate pin by the numeral 51, and the forward pin by the numeral 52. Each actuating-bar is also provided on one side with an outstanding lug 53. (See Fig. 5.) The rear portion of each longitudinal actuating-bar is formed or provided with an arm 54. These several arms incline inwardly or converge toward each other, and from the termination of the inclined portions thereof they extend in straight parallel portions, which are provided on their upper edges with teeth 55.

At the forward end of the machine and journaled in the side pieces of the framework is a shaft 56, said shaft having mounted loosely thereon a series of calculating-wheels 57, the number of said wheels corresponding to the number of longitudinal actuating-bars employed. It is obvious, however, that any desired number of calculating-wheels and actuating-bars may be provided. Each calculating-wheel has arranged around its periphery a series of numbers running from "0" to "9." Each calculating-wheel has also fast to one side thereof a gear-wheel 58. The rear ends of coiled springs 59 are secured to the rear ends of the longitudinal actuating-bars, and the forward ends of these springs are secured to the fixed framework. The tendency of these springs is to throw the longitudinal actuating-bars forward.

The numerals 60 indicate a series of stop-arms, which are shown specifically in Fig. 10. One of these stop-arms is provided for each longitudinal actuating-bar, and each stop-arm is mounted medially on a pivot-pin 61. The upper end of each stop-arm bears against an inclined surface 62, (shown in Fig. 7,) cut into the side edge of each slidable bar 16. Just to the rear of the stop-arms and preferably mounted on the same pivot-pins 61 are a series of arms 63, which I will style "zero-arms," the number of these arms corresponding to the number of stop-arms 60. These zero-arms are shown specifically in Fig. 9 of the drawings, and their upper ends also bear against the inclined surfaces 62 of the slidable bars, while their lower ends are in a position to be normally engaged by the lateral lugs 53 of the longitudinal actuating-bars. Connected to each zero-arm, near the upper end and transversely thereof, is a strip 64, the adjacent ends of said strips contacting. These strips are disposed in the grooveway 65 in the rear end piece of the keyboard. It will be evident from this construction that if an operating-key in any particular line of keys is depressed the pin 18 thereof will ride down the diagonal slot 17 of the particular slidable bar 16 relating thereto and said slidable bar will be forced rearwardly, the incline 62 of course thereby necessarily acting on the upper ends of the stop-arm 60 and the zero-arm 63, and cause said arms to turn on their pivots. The turning of the arm 63 will release its lower end from engagement with the lug 53 of the actuating-bar, and at the same time by the provision of the contacting strips 64 all the zero-arms to the left (taking Fig. 9 as a basis) of the particular zero-arm acted upon by the slidable bar 16 will likewise be turned on their pivots, the purpose of which will be hereinafter more fully explained. When the zero-arms are swung out of engagement with the lugs 53, then upon a turning of the hand-crank 34 (the turning of said hand-crank being necessary for the purpose hereinafter more fully explained) the springs 59 at once thrust the longitudinal actuating-bars relating to the particular keys depressed forward. This forward movement of the longitudinal actuating-bars is limited by contact of the pins 50, 51, or 52 with the depressed keys. The rear pins 50 are for contacting with the depressed keys of the rear sets of keys, pin 51 for the depressed keys of the intermediate set of keys, and the pin 52 for the depressed keys of the forward set of keys. It is necessary that the forward pin 52 should be short enough to pass beneath the lower ends of the keys of the intermediate set of keys, even when said intermediate set of keys are depressed. In consequence the keys of the forward set must extend downwardly a greater distance than the keys of the other sets in order that the short forward pins 52 will engage therewith. This is clearly shown in Fig. 4. At the proper time each arm 60 which was turned on its pivot is returned to its normal position by a spring. In the case of the zero-arm 63 such of these arms as were turned on their pivot in the manner hereinbefore pointed out are returned to their normal position at the proper time by the action of a spring 67, bearing with its free end against the edge of the outermost arm at one side.

In regard to the longitudinal actuating-bars 44 it has already been explained how these bars are thrust forwardly—i. e., by the action of the springs 59 upon the release of the lugs 53 of said bars from the lower ends of the zero-arms 63. It of course becomes necessary at certain periods of the operation of the machine to return the longitudinal actuating-bars to their normal rearwardly-thrust positions. This action is accomplished by means of the mechanism which will now be explained.

Rigid to the outer ends of the shaft 36 are cranks 68 68. (Shown in Figs. 1, 2, and 5.) To the ends of these cranks are pivotally connected the rear ends of links 69 69, the forward ends of said links being pivotally connected to the opposite ends of a transverse movable bar 70, the ends of said bar working in suitable guide-slots 71 71, formed in forward extensions 72 72 from the frame. When all the longitudinal actuating-bars 44 are in the position shown in Fig. 4, or, in other words, are thrust and held rearwardly, the movable transverse bar 70 is at the rear ends of the slots 71 and against the forward ends of the bars 44. Now when it is desired to operate the machine the keys representing the particular bars desired to be operated upon are depressed, and this releases the particular actuating-bars 44 pertaining thereto in the manner hereinbefore fully pointed out. The hand-crank 34 is next turned, and on the turning thereof the links 69 cause the movable transverse bar 70 to move outwardly or toward the forward end of the machine, and as this bar thus moves outwardly the springs 59 are free to cause the longitudinal actuating-bars to move outwardly or forwardly with the bar 70. By permitting the longitudinal actuating-bars to thus move gradually outwardly with the movable transverse bar 70 the sudden or violent outward movement of the actuating-bars by the springs 59 is avoided, and violent contact of the pins 50, 51, or 52 of said bars with the lower ends of the depressed keys is thereby prevented. The bar 70 continues to move outwardly until it reaches the forward ends of the slots 71. The longitudinal actuating-bars 44, however, only move outwardly the distance permitted by contact of the pins 50, 51, or 52 with the lower ends of the depressed keys. Now with the continued turning of the crank-handle the movable transverse bar 70 is caused to move inwardly or in a direction toward the rear end of the machine, and after said bar is moved a certain distance it will contact with the ends of the longitudinal actuating-bars which have been thrust forwardly, and thereby cause said bars to be returned to their normal positions. Just before the completion of the rearward return movement of the longitudinal actuating-bars the mechanism for operating the transverse lever-actuating bar 29 comes into play and releases such of the sliding bars 16 as were thrust rearwardly and permits said sliding bars to be returned to their normal forwardly-thrust positions, the return of said bars of course causing the incline 62 to act on the stop-arms 60 and the zero-arms 63, the zero-arms being thereby turned in a direction to cause them to again engage in advance of the lugs 53 of the longitudinal actuating-bars.

Mounted loosely on the transverse shaft 73, located toward the rear end of the machine, is a series of printing-wheels 74, having around the peripheries thereof a series of type with the numbers "0" to "9" thereon. Secured fast to or integral with the side of each printing-wheel is a toothed wheel 75, and each of these wheels is engaged by the teeth 55 of the arms 54. From this arrangement it follows that when any one of the longitudinal actuating-bars is moved forwardly the teeth 55 engaging with the toothed wheel 75 relating thereto will necessarily turn the particular printing-wheel relating to said toothed wheel. Suitable means should be provided for inking the type on the printing-wheels, and in the accompanying drawings I show the preferred means for accomplishing this, consisting of an inking-disk 76, (see Figs. 1, 2, and 4,) mounted on a short upright shaft 77. Below this disk and mounted fast on the shaft is a ratchet-wheel 78. An arm 79 is mounted loosely on shaft 77, and this arm carries a spring-pawl 80, which engages with the teeth of the ratchet-wheel 78. To the outer end of the arm 79 is pivotally connected a link 81. The outer end of this link is pivoted to the upper end of the long arm of a pivoted bell-crank lever 82. The pivoted bell-crank lever is actuated in a manner hereinafter to be explained, and when said bell-crank lever is rocked a pull is exerted on the link 81, and this causes a turning of the arm 79 and a movement of the pawl 80 carried by said arm from one tooth of the ratchet-wheel 78 to the next tooth thereon, and when the bell-crank lever is no longer operated upon the parts return to their normal position, and in doing so the pawl 80 pushes on the tooth of the ratchet-wheel and causes a slight rotation thereof and a consequent rotation of the shaft 77 and inking-disk carried thereby.

Pivoted at their upper ends to the side pieces 6 6 of the frame are depending levers 83 83, and pivotally connected at their forward ends to these levers are links 84 84. The rear ends of these links are pivotally connected to the lower ends of medially-pivoted levers 85 85. The upper ends of these levers are connected by cross-bars 86 86. These cross-bars are provided on their inner sides near their upper edges with guide-gooves 87 87, (see Fig. 2,) in which fits and slides a plate 88. This plate is provided near opposite ends with upwardly-extending standards 89 89, and these standards form bearings for a shaft 90. On this shaft is mounted a paper carrying and feeding cylinder 91. Beneath the cylinder and extending rearwardly a slight distance from the machine is a paper-feeding table 92. Curving around the front of the cylinder is the usual paper guide and holder 93. Bearing against the under side of the cylinder is the usual yielding guide-roll 94. The shaft 90 has mounted on opposite ends thereof ratchet-wheels 95 95 for spacing the paper. These wheels are engaged by medially-pivoted pawls 96 96. The inner ends of these pawls engage the teeth of the ratchet-wheels, while the outer ends of said pawls are connected by means of a cross-rod 97. The upwardly-extending standards 89 are provided with rearward extensions, as shown most clearly in Fig. 21, and to these extensions are pivoted arms 98 98. The lower ends of these arms are connected by a cross-rod 99, and this cross-rod passes loosely through an opening in the rear end of a pivoted arm 100. The pawls 96 are normally held in engagement with the ratchet-wheels 95 by means of coiled springs 101 101 engaging at their upper ends the rear ends of the pawls and having their lower ends engaging the arms 98. In the operation of turning the cylinder for spacing when said cylinder is swung forwardly, so as to bring the paper into contact with the printing-wheels, each pawl 96 jumps into engagement with the next succeeding tooth of its ratchet-wheel. On the return movement of the paper-carrying cylinder the pawls push against the teeth with which they are now engaging, and thereby necessarily rotate the roller rearwardly a slight distance, the pivoted arm 100 serving as a fixed stop for taking the back pressure of the pawls in effecting this slight rotation of the cylinder. The slight turning of the cylinder of course causes the paper to be fed the proper distance for the printing thereon of the next line of printing. Mounted fast on the outer extremities of the shaft 90 are disks 102 for the purpose of turning the paper-cylinder either forwardly or rearwardly by hand. When it is desired to turn the paper-cylinder rearwardly by hand, all that is necessary to be done is to grasp one of these disks and rotate the same rearwardly, when of course the cylinder will be rotated in the same direction. When it is desired to rotate the cylinder forwardly by hand, finger-pressure is exerted on the rod 97 and said rod thereby pushed forwardly. This causes the pawls to be released from the teeth of the ratchet-wheels, and consequently the cylinder is free to be turned forwardly by turning the disks 102 in that direction.

I provide mechanism for holding the plate 88 and parts carried thereby, which plate and the parts carried thereby will be hereinafter designated as the "carriage" in any position to which they may be adjusted. For this purpose the plate has arranged on its under side a series of teeth 103. Adapted to engage these teeth is the upper toothed or serrated edge of a lever 104, said lever being practically in the form of a bell-crank lever. Working in suitable bearings 105 106 is a push-rod 107, said rod being normally held outwardly by means of a coiled spring 108, surrounding the rod and bearing at its inner end against the end of the bearing 105 and at its outer end against a pin 109, which intersects the push-rod. The outer end of the long arm of the lever 104 is provided with a beveled rearward extension 110, said extension passing beneath the push-rod in position to be acted upon by a correspondingly-beveled surface 111, formed on the push-rod. It is obvious that by pushing the push-rod inwardly against the action of the coiled spring 108 the beveled surface 111 is caused to act against the beveled surface of the rearward extension 110 of the lever 104, and consequently the long arm of said lever by the action of a spring 112 thereagainst is forced upwardly, and this necessarily returns the short arm of the lever downwardly out of engagement with the teeth 103. The carriage is now free to be moved to any position, and when the desired position is reached pressure on the push-rod is removed, and the coiled spring 108 will then return said push-rod to its former position, and thereby permit the toothed or serrated short arm of the lever 104 to again engage the teeth 103 of the plate 88, and hence lock the carriage in its adjusted position.

The shaft 73, on which the printing-wheels are mounted, is journaled in bearings 113 113. (See Figs. 2, 4, 5, and 22.) These bearings are provided with forward extensions which are connected by a transverse rod 114. This rod is encircled by a coiled spring 115, and one extremity of this spring is secured to a plate 116, said plate being pivoted at opposite ends to the bearings 113. The short shaft 77, which carries the inking-disk 76, passes through this plate. The spring normally holds the printing-disk at the inclined position shown in the drawings. Pivoted at their lower ends to the bearings 113 are arms 117 117. The upper rearwardly-projecting ends of these arms have rotatably mounted therein the ends of an axis of an inking-roller 118. Pivoted to medial points of the arms 117 are forward ends of links 119, the rear ends of said links being pivoted to lugs 120, projecting forwardly from the inner connecting-bar 86 of the levers 85. It is evident that as the upper ends of the levers 85 are swung forwardly in order to carry the paper-carrying cylinder against the type of the printing-wheels the links 119 cause the upper ends of the arms 117 to be thrown forwardly, and consequently the inking-roller 118, carried by said arms, is caused to be rolled over the inking-disk. As the inking-roller passes over this disk the said disk will be tilted slightly by reason of the pivot afforded by the pivoted plate 116. This pivot also serves the function of permitting the inking-disk to be tilted slightly by finger-pressure thereon when the inking-roller is not on said disk, so as to provide for access to the type on the printing-wheels beneath said disk for the purpose of cleaning said type.

Secured to a fixed portion of the frame is an arm 121, the upper end of said arm being bent inwardly. The extremity of this inwardly-bent portion has secured thereto an ink-pad holder or receptacle 122, said holder being open at opposite ends. Within the holder is an ink-pad 123, the lower end of said pad being exposed through the lower opening of the holder and bearing against the printing-disk, so as to keep said disk constantly supplied with ink.

Projecting rearwardly from the rear end of the machine are arms 124, (see Figs. 1 and 2,) provided with sockets 125, in which are removably seated the ends of a shaft 126. This shaft has wound thereon the paper 127, upon which the printing is done. This paper is extended upwardly from the shaft over the paper-table, thence between the under side of the paper-carrying cylinder and the guide-roller therebeneath, and thence continued forwardly around the front of the paper-carrying cylinder and between said cylinder and the paper-holder.

By referring to the printing-wheels it will be found that there is a space 128 formed between every two of the projecting type. These spaces when several of the printing-wheels are brought into printing position are adapted to be engaged by suitable mechanism, so as to hold said wheels firm in adjusted position, and thereby provide for proper alinement. In the drawings I show for this purpose a bar 129, (see Figs. 2 and 4,) provided at its ends with depending legs 130, which are connected to the inner cross-bar 86 of the levers 85. It is obvious from this construction that when the upper ends of the levers 85 are thrust forwardly the bar 129 is carried therewith and caused to engage with the registering spaces 128 of the printing-wheels, and thereby hold said wheels locked, with the grooves of the several wheels which have been brought to printing position properly registering, and the type thereby alined ready for printing. Of course on the return rearward movement of the levers 85 the bar 129 is withdrawn from engagement with said spaces 128.

Any desirable means for causing a movement of the links 84 in order to effect the printing operation may be employed; but I prefer to employ the automatic means herein shown and now about to be described.

Mounted on a transverse shaft 131 is a cam-cylinder 132. At the opposite ends of this cylinder are the cam-surfaces 133 133, provided with projections 134 134. The depending levers 83 are provided with forward projections 135 135, which projections carry antifriction-rollers 136 136. Rotation is imparted to the cam-cylinder by means of a toothed wheel 137, mounted on the shaft 131 of said cylinder, said toothed wheel being in mesh with the toothed wheel 35. It will be evident that from this construction when the hand-crank 34 is operated the toothed wheel 137, through the series of intermeshing toothed wheels, will cause the cylinder 132 to rotate. As said cylinder thus rotates, the antifriction-rollers 136 will ride around on the cam-surfaces 133, being held in contact therewith by coiled springs 138 engaging at their rear ends the lower ends of the lever 83 and engaging at their forward ends fixed portions of the frame. When the cylinder has been rotated sufficiently far to bring the projections 134 of the cam-surfaces into engagement with the antifriction-rollers 136, and thereby turn the levers 83 in a direction to cause the links 84 to be thrust rearwardly, the medially-pivoted levers 85 are thereby turned in a direction to cause their upper ends and the paper-carrying cylinder carried thereby to be thrust forwardly, the said cylinder thereby bringing the paper into contact with the type on the printing-wheels which have been brought to printing position. Now with the continued turning of the cam-cylinder the projections 134 leave the antifriction-rollers 136, and consequently the levers 83 will be turned by the springs 138 back to normal position, and hence the links 84 and the medially-pivoted levers 85 will also be returned to normal position.

The shaft 32 is normally locked against being rotated. To accomplish this, the wheel 33 has projecting inwardly from its inner face a pin 139. (See Fig. 2.) This pin is adapted normally to engage a shoulder 140, formed on one edge and near the upper end of a lever 141, said lever being pivoted at its lower end to one of the side pieces of the frame. The upper end of this lever is bent inwardly, as indicated by the numeral 142. (See Fig. 1.) This inwardly-bent upper end lies back of the transverse bar 21. By this arrangement when one of the operating-keys is depressed the slidable bar 16 relating thereto is necessarily forced rearwardly, and this causes the rear end of said slidable bar to act against one of the projecting fingers 23 of the bar 21, and hence said bar is thrown rearwardly and acts against the inwardly-extending upper end 142 of the lever 141 and causes said lever to be turned rearwardly, and hence releases the shoulder 140 thereof from engagement with the pin 139, when of course the shaft 32 is free to be turned by the hand-crank. This unlocking may also be accomplished by finger-pressure when it is desired to turn the shaft 32 for the purpose of effecting the spacing of the paper without operating upon the calculating-wheels. The bar 29 has projecting slightly above its upper edge the lugs 143 143, and between these lugs is received a forward projection 144 from a pivoted dog 145. (See Fig. 1.) Connected to this dog is a long rod 146, which extends rearwardly, and its rear end is in position to act against the inward extension 142 of the lever 141. By this arrangement when the rod 40 is depressed by finger-pressure on the upper end thereof the lever-actuating bar is necessarily moved to the left, and this causes, through the engagement of the lugs 143 with the forward projection 144 of the dog 145, a rearward movement of the rod 146. This movement of said rod causes the rear end thereof to act against the inward extension 142 of the lever 141, and consequently said lever is turned in a direction to release its shoulder 140 from the pin 139 of the wheel 33, and consequently the shaft 32 is free to be turned by its crank 34. A spring 147 acts on the lower end of the lever 141 and serves to throw the upper end of said lever inwardly after the wheel 33 has been rotated to a position to again have its pin 139 engaged by the shoulder 140, so that said engagement is again effected at the proper time. After a key is depressed and the crank-handle has almost completed its turn, the particular slidable bar relating to the particular key depressed is returned to its normal forwardly-adjusted position in the manner hereinbefore pointed out, and with this return of said slidable bar the bar 21 is no longer held rearwardly, but is pulled forwardly by the action of the spring 24. As this bar 21 turns forwardly it no longer acts against the inward extension 142 of the lever 141, and hence said lever is permitted to be turned inwardly by the action of the spring 147 thereon, so as to again bring its shoulder in position to be engaged by the pin 139.

It is necessary in machines of this character to provide means when one of the calculating-wheels has made a complete revolution—i. e., has been turned so as to bring "0" to view through the sight-opening—for carrying over onto the next calculating-wheel of the series. To provide for this, a pin 148 (see Fig. 16) projects from the periphery of each calculating-wheel of the series. A series of spring-pressed pivoted dogs 149 are so arranged that their upper ends are in position to be acted upon by the pins 148 when the calculating-wheels make a complete revolution. Each dog is provided with a notch 150 and also with a shoulder 151 below said notch. A series of spring-pressed levers 152 are also provided. Each of these levers is provided with a projecting lug 153, which normally rests in the notch 150 of the dog 149 relating thereto. Each lever 152 is also provided with an upward extension 154, which when the lug of said lever is in engagement with the notch 150 of the spring-pressed dog 149 is behind a pin 155, projecting laterally from the slidable rack-bar 46, and hence holds said rack-bar at its forwardly-adjusted position against the pin 47. In the operation of this carrying-over mechanism when one of the calculating-wheels has completed its revolution, or, in other words, is rotating the distance from the numeral "9" thereon to the "0" mark, the pin 148 of said calculating-wheel will engage the upper end of the dog 149, relating to the next succeeding calculating-wheel, and turn said dog rearwardly on its pivot. This will release the lug 153 of the lever 152 from engagement with the notch 150, and thereby permit the lever 152 to drop by the action of the spring thereon, bringing the lug of said lever into engagement with the shoulder 151 and also bringing the upper end of the extension 154 below the laterally-extending pin 155 of the rack-bar 46. This releases the rack-bar and permits the spring thereof to move said rack-bar rearwardly to the extent permitted by contact of the rear end of said rack-bar with the pin 48. This limited movement of said rack-bar is sufficient to turn the gear wheel of said next succeeding calculating-wheel the distance necessary to carry over one number from the calculating-wheel relating to the longitudinal actuating-bar which has been operated to the next succeeding calculating-wheel of the series. For returning a rack-bar 46 to normal position after said rack-bar has accomplished its function of carrying over I provide each of said rack-bars with a depending finger 156. I also provide a transverse medially-pivoted bar 157, which is adapted to act on the fingers 156. This bar has projecting therefrom an arm 158, which carries at its lower end an antifriction-roller 159, adapted to be acted upon by a cam-surface 160 on cam-cylinder 132. After the carrying over is effected the said cam-surface acts on the roller 159, and thereby turns the bar 157 in a direction to act on the finger 156 of the rack-bar which has been actuated, and consequently thereby return and hold said rack-bar to its normal forwardly-adjusted position. After this operation it is of course also necessary to return the lever 152 to normal position, (shown in Fig. 12,) the upward extension 154 of the lever 152 being still in its lower position, but the pins 155 being now in a position so as not to interfere with the subsequent up movement of the extension 154. This is accomplished by loosely mounting on the pivot-shaft 161 of the levers 152 forward extensions 162 from a transverse bar 163. This bar is provided with a rearwardly-extending arm 164, said arm carrying at its rear end an anti-friction-roller 165, which is adapted to be acted upon by a cam-projection 166 from the cam-cylinder 132 to cause a raising of the transverse bar 163, the said transverse bar upon being so raised acting against the lever 152 and raising said lever to its normal position, the dog 149 being turned forwardly at the same time by action of the spring 167 thereagainst, and thereby turning said dog forwardly, so that it will be in position to have its notch 150 engaged by the lug 153 of the lever 152 when said lever is thus raised, and at the same time the extension 154 of the lever 152 is brought in advance of the pin 155, projecting from the rack-bar, and consequently said rack-bar is thereby again locked in its forwardly-adjusted position. It will be understood, of course, that these operations do not occur until the rack-bar is returned to its normal forwardly-adjusted position, as previously explained.

In the operation of this machine on the forward movement of the longitudinal actuating-bars 44 the teeth of the rack-bars 46 thereof do not engage the gear-wheels 58 of the calculating-wheels except when printing total or turning to zero, but only engage therewith on the return rearward movement of said actuating-bars. In order to hold the teeth of the rack-bars firmly in engagement with the teeth of the gear-wheels during this rearward movement of said actuating-bars, I provide a pivoted bar 168. I furthermore provide pivoted bell-crank levers 169 169. (See Figs. 4, 17, and 18.) The end of one arm of each of these levers extends beneath the pivoted bar 168, and the end of the other arm of each of said bell-crank levers carries an antifriction-roller 170. These rollers are adapted to be acted upon by cam projections 171 171 on the cam-cylinder 132. These cam projections are at opposite ends and upon opposite sides of the drum 132, the cam 171 on the left of the machine being on the upper half of the drum 132 and the cam projection on the right-hand side being on the under half of the drum. The cam 171 on the left-hand end of drum acts on bell-crank lever 169 to the left, and the cam 171 on the right-hand end of drum acts on bell-crank lever 169 to the right. Normally the pivoted bar 168 is raised up, so as to have the teeth of the rack-bars in engagement with the gear-wheels of the calculating-wheels, the parts being held at this position by reason of the engagement of the end of the cam projection 171 with the antifriction-roller 170. With the turning of the hand-crank 34 the anti-friction-roller drops off the end of the cam projection 171 on the left, and thereby allows the pivoted bar 168 to drop, and this of course allows the longitudinal actuating-bars to drop and permit the same to move forwardly without turning the calculating-wheels. On the return rearward movement of the actuating-bars, however, the end of the cam projection 171 on the left will reach the antifriction-roller 170 of the left-hand bell-crank lever 169 and act upon the same, and thereby cause a turning of said bell-crank lever in a direction to raise the pivoted bar 168, and thereby throw the rack-bars carried by the actuating-bars into engagement with the gear-wheels, and hence cause a rotation of the calculating-wheels, this engagement continuing during the rearward movement of the actuating-bars by reason of the cam acting on the antifriction-roller during such rearward movement. It will be noticed that the bar 168 (see Fig. 12) has a series of upwardly-extending fingers 168', which overlap the tops of the actuating-bars 44 alongside of rack-bars 46. When bar 168 drops, the fingers 168' draw bars 44 down, and consequently the teeth of rack-bars 46 out of engagement with the gear-wheels 58. On the forward movement of the longitudinal actuating-bars the gear-wheels 58 are locked against turning by means of a series of pawls 172, extending from a pivoted bar 173. (See Figs. 4 and 12.) Normally this bar is down, so that the pawls are in engagement with the gear-wheels. On the return rearward movement of the actuating-bars, however, and when the pivoted bar 168 is turned upwardly, as just described, said bar acts upon a downward extension 174 (see Fig. 3) from a lever 175, (see Figs. 2, 3, and 4,) which downward extension rests upon the bar 168. The upper horizontal arm of this lever engages an antifriction-roller 176, turning on a lateral extension from the upper end of an arm 177, which arm extends from the pivoted bar 173. By this arrangement when the bar 168 is uplifted the downward extension 174 of the lever 175 is so acted upon as to cause the bar 173 to be thrown upwardly, and hence the pawls 172 are thereby released from engagement with the gear-wheels 58. A spring 178 acts on the lever 175 and serves to return said lever to its normal position. Another spring, 179, acts on a finger 180, projecting from the bar 173, and hence acts to return said bar to its normal position.

It sometimes happens that by accident a wrong operating-key is depressed. If no means were provided to prevent it, before said keys could be returned to their normal position it would be necessary to turn the crank-handle, and consequently the wrong number would be added on the calculating-wheels and the wrong number printed on the slip of paper. It is therefore important that means should be provided for returning the operating-keys to normal position after being depressed and without the necessity of turning the crank-handle just referred to.

It is through the medium of the upward extension of the rod 40 that I am enabled to return the operating-keys when a wrong key is depressed, without the necessity of operating the calculating-wheels and the printing mechanism. This is accomplished merely by pressing downwardly on the finger-button of the rod 40, and this will cause a down movement of said rod, which down movement will cause the lever-actuating bar 29 to move longitudinally, and hence release the slidable bar 16 and permit said bars to return to normal position. With the returning of the slidable bars to normal position of course the operating-keys are also free to return to their normal position. The rod 40, after finger-pressure thereon is removed, is returned to its normal position by the action of the spring 43.

After a total of several numbers is displayed on the calculating-wheels it is desirable that said total should remain displayed on the wheels until the printing of the total is effected, so that the total as shown by the calculating-wheels and the total amount printed may be compared and found to agree. To provide for this, I employ a cross-bar 181, (see Fig. 5,) having projecting therefrom a series of fingers 182, which extend adjacent to the side edges of the lower ends of the stop-arms 60. To the opposite ends of this bar are connected the long arms of pivoted bell-crank levers 183 184, the short arms of said levers being connected, respectively, to the rear ends of rods 185 and 186. The rod 185 on the left of the machine is provided with an outwardly-bent portion 187. The extremity of this outwardly-bent portion is in position to be engaged by a pivoted lever 168, which may be termed a "total-retaining" lever. The movement forward of this lever operates rod 185, and this causes a movement of the cross-bar 181 to the left, and the fingers 182 of said bar strike against the stop-arm 60 and turn said arms on their pivots, and thereby hold said arms out of line with the lateral lugs 52 of the longitudinal actuating-bars 44. The lever 188 (see Fig. 3) is locked in this position by reason of the engagement of a notch 189, formed on the under edge of a medially-pivoted lever 190, with a lateral lug 191 projecting from the lever 188. Normally the unnotched extremity of this total-retaining lever 190 rests on the top of the lug 191. When the lever 188 is turned rearwardly, however, the forward end of the lever 190 drops by the action of a spring 192 on the under side of the extremity of the rear arm of said lever, and the notch 189 of said lever is brought into engagement with the lug 191, and consequently the lever is held locked in this position and at the same time the cross-bar 181 is held in its adjusted position with the fingers thereon bearing against the stop-arms 60. The notch of the lever 190 is released from engagement with the lug 191 at the proper time by the action of the left-hand link 69, which at a certain period of its movement contacts with a pin 193, projecting rearwardly from the rear end of said lever, and thereby causes said lever to be turned in a direction to release its notch from engagement with the lug 191. The moment this release occurs a spring 194, acting on the total-retaining lever 188, returns said lever to its normal position. Pivotally connected to the lever 188 is a link 195, the forward end of said link being connected to the lower end of one arm of a pivoted bell-crank lever 196. The short arm of this bell-crank lever is provided with an inward extension 197. This inward extension extends below the bell-crank lever 169 (see Fig. 17) on the left-hand side of the machine. It follows that when the lever 188 is thrust rearwardly the inward extension from the bell-crank lever 196 acts on the bell-crank lever 169 and causes the upper arm of said latter bell-crank lever to act against the pivoted bar 168, and thereby hold the longitudinal actuating-bars 44 in raised position, with the teeth of the rack-bars 46 in engagement with the gear-wheels 58, it being understood that bar 168 is normally up and that when lever 188 is actuated bar 168 remains in position to keep actuating-bars 44 in connection with the gear-wheels until the crank has been turned. Pivoted in the side pieces of the framework is a cross-bar 198, which has a series of forwardly-extending fingers 199, (see Figs. 4, 12, and 16,) there being one of said fingers for each calculating-wheel, and each calculating-wheel in turn is provided with a laterally-extending pin 200, against which an upward extension from the end of each finger is adapted to strike.

In the operation of printing total and retaining total on calculating-wheels the first thing to be done is to press down the rod 40, which unlocks the crank-handle 34. The said crank-handle is then turned once, which causes the paper to be spaced the distance of one line. The total-retaining lever 188 is next moved rearwardly, and this throws the stop-arms 60 out of line with the lateral lugs 53, as hereinbefore described, and at the same time keeps the pivoted bar 168 raised for the purpose of holding the longitudinal actuating-bars in engagement with the gear-wheels 58. Next the operating-key 9, corresponding to the calculating-wheel displaying the first number of the total, is depressed. This has the effect of turning zero-arm 63, relating to said depressed key, as well as turning all the other zero-arms to the right thereof, out of line with the lugs 53. The crank-handle is now again turned, and this causes all the longitudinal actuating-bars which have thus been unlocked to be moved forward. In this forward movement the rack-bars 46 being held in engagement with the teeth of the gear-wheels 58 said gear-wheels are turned rearwardly until they are stopped by the fingers 199 of the cross-bar 198 contacting with the pins 200 of the calculating-wheels, and this stopping occurs when the calculating-wheels operated upon display "0." With this movement of the longitudinal actuating-bars forwardly the printing-wheels are turned to bring the characters thereon corresponding to the total to be printed into printing position. Now with the continued turning of the crank-handle the paper-cylinder is thrust forwardly against the type and the total is printed on the paper, and after the printing and with the continued turning of the crank the longitudinal actuating-bars are forced rearwardly, and the sum-total on the calculating-wheels is again brought to position for display through the sight-opening. It will be understood that in thus writing and retaining total on calculating-wheels cam 171 to the left is inactive, inasmuch as by the action of lever 188 and its connecting bell-crank lever 196 bar 168 is kept raised until lever is again released.

In order to guard against an operator omitting to space before beginning the operation of printing the total, I provide on the side of the machine illustrated in Fig. 3 a pivoted bell-crank lever 201. (See Fig. 3.) The lower arm of this bell-crank lever has an inward extension 202, (see Fig. 5,) which passes through a slot 203 in one of the side pieces 6 of the frame and is adapted to be acted upon by the transverse-pivoted bar 157. (Shown most clearly in Figs. 4 and 12.) The upper arm of the bell-crank lever 201 is provided at its forward extremity with a notch 204, which is adapted to engage over a lug 205 on the lever 188. In explanation of the operation of this if the operator should fail to depress the rod 40 and turn the hand-crank for the purpose of spacing before printing the total and should then attempt to press the total-lever 188 rearwardly he could not do so in view of the fact that the longitudinal actuating-bars which had been actuated for the purpose of displaying the total were necessarily thrust forwardly and then rearwardly by the turning of the crank-handle. It will be understood that in the displaying of the total on the calculating-wheels in most every case the carrying-over mechanism is operated, and when operated the rack-bar 46, which is operated for effecting the carrying over, is thrust rearwardly to the limit permitted by contact with the pin 48, as previously explained, and in this rearward position of the rack-bar 46 its depending finger 156 keeps the upper end of bar 157 extended rearwardly. This rearward movement of the upper end of bar 157 acts on the inward extension 202 from the bell-crank lever 201, and consequently throws the notch 204 of the upper arm of said bell-crank lever into engagement with the lug 205, and thereby locks the lever 188 and also a lever 206, (see Fig. 2,) hereinafter referred to and located on the side of the machine opposite to the side where the lever 188 is located. Now in order to unlock the levers 188 and 206 it is absolutely necessary to turn the hand-crank 34, so as to return the rack-bars 46 to normal position and at the same time spacing the paper.

To turn calculating-wheels to zero, or when it is desired to print the total shown on calculating-wheels and not retain the total on calculating-wheels, this is done by first moving the zero-lever 206 rearward, then depressing operating-key 9 corresponding to the calculating-wheel displaying the first number of total, and giving crank a turn. On the side of the machine where the lever 206 is located is also located another of the bell-crank levers 201, provided with the inward extension 202, and the lever 206 is also provided with the lug 205 to be engaged by the notch 204 of the bell-crank lever 201 when said lever is turned by the action of the bar 157 on the inward extension 202, and consequently both levers 188 and 206 are locked when the pivoted bar 157 is turned rearwardly in the manner hereinbefore explained. On said side of the machine is also located one of the levers 190, which is adapted to coöperate with the lug 191 on lever 206. The lever 206 being moved rearwardly throws the stop-arms 60 out of line with the lateral lugs 53 by reason of said lever 206 acting against the outward projection from rod 186, said rod in turn being connected through the bell-crank lever 184 with the transverse bar 181. When lever 206 is thus thrust rearwardly, other actions take place—viz., it moves a lever 207, (see Figs. 17 and 18,) pivoted at a medial point to the under side of bar 168 and connected to lever 206 by a link 208 rearwardly to bring it into engagement with the bell-crank lever 169 on the right of machine and out of the way of the bell-crank lever 169 to the left of machine. Next the depressing of the operating-key 9 corresponding to the calculating-wheel displaying the first number of the total has the effect of turning zero-arm 63, relating to said depressed key, as well as turning all the other zero-arms to the right thereof out of line with the lugs 53. The crank-handle being now turned causes the cam 171 to act against the bell-crank lever 169, which acts against lever 207 and bar 168 to keep the actuating-bars 44 in engagement with the gear-wheels 58 during the forward movement of the actuating-bars 44. The cam 171, being out of line to act against the bell-crank lever 169 on the rearward movement of the actuating-bars 44, allows the bars 44 on their rearward movement to drop out of engagement with the gear-wheels 58. Said gear-wheels are turned rearwardly until they are stopped by the fingers 199 of the cross-bar 198 contacting with the pins 200 of the calculating-wheels, and this stopping occurs when the calculating-wheels operated upon display "0." With this movement of the longitudinal actuating-bars forwardly the printing-wheels are turned to bring the characters thereon corresponding to the total to be printed into printing position. Now with the continued turning of the crank-handle the paper-cylinder is thrust forwardly against the type and the total is printed on the paper, and after the printing and with the continued turning of the crank the longitudinal actuating-bars are forced rearwardly, but being then out of gear with calculating-wheels 57 allow the calculating-wheels to remain at zero. When the lever 206 is thrust rearwardly, the notch on the under side of the arm 190 on the right-hand side of the machine (shown in Fig. 2) engages the lug 191 of lever 206 and holds said lever thrust rearwardly for a limited time. In order to release the lever 206 after the required operations have taken place, I provide on the toothed wheel 137 a laterally-extending pin 246, (see Fig. 2,) which after the wheel has been rotated a certain distance will engage the end of the arm 190 and raise said arm sufficiently high to disengage its notch from the lug 191. A spring 247, which bears against lever 206, will then return said lever to its normal position.

In order to guard against the operator not returning the hand-crank 34 back to its normal position, I provide certain mechanism, which will now be explained. This consists in providing a series of pivoted pawls 209. (See Fig. 11.) In front of these pawls is a transverse bar 210, said bar provided with projecting lugs 211. One end of this bar projects out laterally and on its front edge is provided with a beveled notch 212, which is engaged by a beveled lug 213, projecting from the toothed wheel 33. Each pawl is acted against by a spring 214, and a spring 215 (see Fig. 2) acts against the bar 210 and assists in forcing said bar inwardly when the lug 213 is released therefrom. In the operation of this mechanism if, for instance, any key in the line of keys is operated the slidable bar 16 relating thereto will be forced rearwardly in the manner hereinbefore pointed out. The hand-crank is thereby released. The operator now turns this crank, and this causes the lug 213 to be released from the notch 212, and the moment this release occurs the bar 210 by the action of the spring 215 thereagainst and also by the action of the springs 214 against the pawls causes said bar to move inwardly, and thereby brings the pawls 209 thereof just back of little pins 216, projecting rearwardly from the slidable bars 16, and hence thereby lock all the slidable bars relating to the keys not operated against being moved rearwardly, and hence should the operator not turn the handle all the way around it is impossible to depress any of the operating-keys until said handle is brought back to its original position. On returning to its original position the lug 213 engages the beveled notch 212, and hence draws the bar 210 outwardly, and thereby removes the pawls 209 from their locking position back of the small pins 216.

I provide means for repeating a number without the necessity of duplicating the operation of striking the keys. This consists in the provision of a repeating-lever 217. (See Fig. 3.) This lever when swung rearwardly is adapted to act against a projecting lug 218 from a transverse bar 219, (see Figs. 2 and 4,) said bar having its ends bent downwardly and pivoted to the side pieces of the frame. The upper edge of each slidable bar 16 is provided with an upwardly-extending tooth 220. (See Figs. 4, 7, 8, 9, 10, and 11.) The transverse bar 219 is normally held upward at the position shown in Fig. 4 by means of a spring 221. (See Fig. 3.) In the operation of this repeating mechanism if, for instance, it is desired to repeat "243" a number of times the "2," "4," and "3" keys of the proper lines of keys are depressed. The lever 217 is then turned rearwardly until a notch 222 in the rear edge thereof engages the outwardly-extending lug 218 of said lever. This will cause the bar 219 to be turned downwardly. Of course the slidable bars 16 relating to the keys depressed were by the operation of said keys moved rearwardly, and when the bar 219 is thus turned downwardly the said bar is brought in front of the teeth 220 of the slidable bars 16, and consequently said slidable bars are prevented from moving forward. All the other slidable bars 16 are necessarily locked against rearward movement, and hence merely by continuing the turning of the hand-crank the "243" can be repeated any desired number of times, the printing-wheels and calculating-wheels relating to said particular numbers rotating back and forth each time the crank is turned, the said numbers on the printing-wheels always being brought into printing position when the paper-carrying cylinder is brought forward thereagainst. In this operation it is necessary, however, to return the lever 217 to its normal position before completing the final turning of the hand-crank. I also preferably employ in connection with this repeating mechanism gong mechanism, whereby an alarm is sounded when the hand-crank is on its last turn to repeat the figures a certain number of times. This mechanism consists of an index-wheel 223, (see Fig. 4,) having a graduated scale (shown in Fig. 1) therearound to indicate a number of turns of the hand-crank. This index-wheel has fast thereto a ratchet-wheel 224, with which ratchet-wheel a pawl 225 is adapted to engage, said pawl being carried by a pivoted lever 226. The lever 226 is in position to be acted upon by a pivoted arm 227. The forward end of this arm in turn is in position to be acted upon by the crank 68 on that side of the machine. On the inner end of a short rock-shaft 228 is a bell-hammer 229, the head of which is adapted to be brought forcibly against the inner side of the index-wheel 223 when said shaft is turned in one direction, and thereby sound an alarm. The turning of the rock-shaft is effected by means of the engagement of a short stud 230, projecting from the outer face of the ratchet-wheel 224, with a curved arm 231. In the operation of this alarm mechanism the index-wheel is normally set so that "0" thereon is in register with the index-mark 232 of the sight-opening 233 of said index-wheel. In this position the stud 230 is bearing on the extreme end of the curved arm 231. Now, for instance, it is desired to repeat a certain number, say, three times, the mark indicating three on the index-wheel is brought in register with the index-mark 232, and this will bring the stud 230 in such position that it will pass off the end of the curved arm 231 when the index-wheel has been actuated the distance of three teeth. The operating-keys representing the number desired to be repeated are then depressed and the repeating-lever forced rearwardly, as previously explained, and the crank turned until the gong sounds, the alarm sounding just before the completion of the third turning of the handle. It will be understood that with each turning of the hand-crank the crank 68 is caused to act on the pivoted arm 227, and this arm in turn acts on the pivoted lever 226, and as the pawl 225 is carried by the lever 226 said pawl is thereby made to engage a tooth of the ratchet-wheel 224 each time the hand-crank is operated, and consequently on the third turning of the hand-crank the pawl 225 will have engaged three teeth of the ratchet-wheel, and its engagement with the last tooth of these three teeth will have rotated said ratchet-wheel the required distance to permit the stud 230 to escape the end of the arm 231, and a coiled spring 234, which surrounds the rock-shaft 228, rocks said shaft in a direction to cause the bell-hammer to strike the inner side of the periphery of the index-wheel, and thereby sound the alarm. If desired, the repeating may be accomplished without the necessity of pressing rearward the repeating-lever merely by holding the depressed keys downward by finger-pressure thereon and then continuing the turning of the hand-crank.

In connection with the explanation of the repeating mechanism it has just been stated that the crank 68 on one side of the machine operates on the pivoted arm 227 with each turning of the hand-crank, and this pivoted arm in turn operates the lever 226 and causes an intermittent rotation of the ratchet-wheel 224 in order to effect the sounding of the alarm. The operation of this arm 227 also performs other functions. It will be remembered that the bell-crank lever 82 has been previously explained, said bell-crank lever being adapted to operate a link 81 and said link in turn to operate an arm 79, which arm carries a spring-pawl 80, and that this pawl intermittently engages a ratchet-wheel 78, mounted on the short shaft 77 of the inking-disk, and thereby causes an intermittent rotation of said inking-disk, so that the ink may be spread over the entire surface thereof. It will be noticed that the upper edge of the pivoted arm 227 is immediately below the short arm of the bell-crank lever 82, and consequently when said pivoted arm is turned upwardly by the action of the crank 68 thereon on each turning of the hand-crank said bell-crank lever is necessarily turned on its pivot in a direction to cause through the described connections an actuation of the ratchet-wheel 78.

After an operator starts to turn the crank-handle 34 in the proper direction it is desirable that this turning should be completed in this direction, or, in other words, that said crank-handle should not be turned backward. To prevent this, I provide on one side of the machine a spring-arm 235, (see Fig. 3,) having a shoulder 236 formed on its outer side and near its upper end. The outer side of the upper end of this arm is also beveled, so that the link 69 may escape the same without being impeded in its movement. By this construction when the crank-handle is turned in the proper direction the link will readily escape by the upper end of the arm 235. After passing the shoulder 236, however, if it is attempted to reverse the direction of rotation of the crank-handle the said link will strike against the shoulder 235, and hence said handle will be prevented from being turned backward. It is also desirable that the crank-handle should always be started to be turned in the proper direction—i. e., toward the rear of the machine. To insure this, I provide another spring-arm 237, said arm provided at its lower end with a shoulder 238. This shoulder is so located that the crank 68 on that side of the machine will normally rest thereon. It is obvious by this arrangement that should an attempt be made to turn the crank-handle forwardly this could not be accomplished, owing to the obstruction afforded by the shoulder 238 against the crank 68. When the crank-handle is turned rearwardly, however, the crank 68, before said handle completes its turn, will escape by the beveled outer face of the shoulder 238.

For properly adjusting the paper-carrying cylinder, so that the paper carried thereby will be brought firmly against the type on the printing-wheels which have been brought to printing position, I mount adjustably on the rear ends of the links 84 an adjusting device 239 (see Figs. 2, 3, 4, and 19) and provide each link with elongated slots 240 240, through which screws 241 241 pass and enter the adjusting devices. Each adjusting device has a laterally-extending pin 242, upon which the medially-pivoted levers 85 are pivoted. Each adjusting device is also provided with an extension 243 at right angles thereto, and each extension is provided with a threaded opening through which an adjusting-screw 244 passes and bears against the end of the link 84. It is obvious that the adjustment of the throw of the medially-pivoted levers 85 may be obtained merely by loosening the screws 241 and then turning the adjusting-screw 244 in the proper direction to obtain the desired throw of the medially-pivoted levers.

Before commencing to operate the machine it should be seen that all the calculating-wheels are set at "0," which is accomplished in the manner hereinbefore fully pointed out.

In performing a mathematical problem it is of course necessary to depress the operating-keys and then turn the hand-crank 34. This has the effect of permitting the longitudinal actuating-bars 44 to move forwardly by the action of the springs 59, the forward movement being limited by contact of the fingers 50, 51, or 52 of the longitudinal actuating-bar with the lower end of the depressed key, and this movement is such as to cause the printing-wheels 74, through the engagement of the teeth 55 with the gear-wheel 75, to be rotated the proper distance to bring the type of the printing-wheels corresponding to the numerals of the keys depressed to printing position. At the same time the paper-carrying cylinder is thrown forwardly, so as to bring the paper carried thereby into engagement with the type of the printing-wheels which have been brought to printing position. With the continued turning of the hand-crank the paper-carrying cylinder is returned to normal position and the transverse bar 70 begins its rearward return movement, and thereby causes the longitudinal actuating-bars 44 to be moved rearwardly, which rearward movement will cause the several calculating-wheels to be turned so as to display the numbers corresponding to the keys depressed through the elongated sight-opening 4, and also the other portions hereinbefore described will take place. In connection with this general description of the operation of my machine an important function of certain of the mechanism will now be referred to. This is the capability of the machine to print zero with only the necessity of depressing one key. It will be understood that the calculating-wheels are always normally set at "0," whereas the printing-wheels are normally set at blank spaces. For instance, suppose it is desired to display or add "100" on the calculating-wheels and to print this number on the slip of paper. To accomplish this, it is only necessary to depress, for instance, the "1" key in the third line of keys. This pressing downwardly of the "1" key will turn its zero-arm 63 out of engagement with the lug 53 of its actuating-bar 44 and also turn the companion arm 60 on its pivot, and hence unlock said actuating-bar, so as to permit it to move forwardly when the hand-crank 34 is turned. This movement, which is limited by contact of the pin 50, 51, or 52 with the depressed key, is sufficient to turn the printing-wheel relating to the particular actuating-bar so moved a sufficient distance to rotate the printing-wheel from the blank space which is in printing position to a position to bring the numeral "1" of the printing-wheel into printing position, and on the subsequent return movement of said actuating-bar the calculating-wheel relating thereto is turned from its normal position in which "0" is displayed through the sight-opening to a position in which "1" is visible through said sight-opening. At the time the zero-arm 63 referred to was turned all the zero-arms to the left thereof (taking Fig. 10 as the basis) were also turned in the manner hereinbefore fully pointed out. The arms 60, however, mounted on the pivots of these particular zero-arms 63 to the left of the actuating-bar relating to the key operated, are not turned. The turning of these zero-arms will release them from engagement with the lugs 53 of the longitudinal actuating-bars relating thereto, and said actuating-bars are thereby permitted to move forwardly until the lugs 53 thereof contact with and are stopped by the engagement of said lugs with the lower ends of the arms 60. This slight movement of the longitudinal actuating-bars is sufficient to turn the printing-wheels relating thereto sufficiently far to bring the zeros thereof to printing position. The longitudinal actuating-bars relating to the zero-arms other than the one pertaining to the key operated are moved forwardly a shorter distance than the longitudinal actuating-bar relating to the key operated and are also moved independently of the rack-bars 46, the said rack-bars remaining stationary, with the result that on both the forward and rearward movement of said actuating-bars the said rack-bars do not act on the teeth of the gear-wheels 58, and consequently the calculating-wheels relating to said actuating-bars are not turned, and therefore remain with "0" displayed through the sight-opening.

In the operation of adding by my improved machine it will be supposed that it is desired to add "4750," "5060," and "825." To accomplish this, first operate key "4" in the fourth column, key "7" in the third column, and key "5" in the second column. Now give crank-handle a turn and the calculating-wheels show "4750." Next press key "5" in the fourth column and key "6" in the second column. Turn crank-handle and calculating wheels will show "9810." Next press key "8" in third column, key "2" in second column, and key "5" in first column. Turn crank and calculating-wheels will now show total of "10635." Now press downwardly rod 40 to unlock the hand-crank 34 and give said crank a turn to space paper for divisional space between listed figures and the total. The total is now printed by actuating either lever 206 or 188, next depressing operating-key "9," corresponding to the calculating-wheel displaying the first number of the total. Then give crank a turn.

While in the accompanying drawings I have shown the characters on the calculating-wheels and on the printing-wheels as numerals running from "0" to "9," yet it will be understood that these characters may be changed to characters in other languages or to suit currency designations used in any country.

While I have herein shown and described specific details of construction, yet I do not wish to be understood as restricting myself thereto, inasmuch as mechanical changes or variations thereof capable of performing the same functions are deemed to be within the spirit and scope of my invention.

I have failed heretofore to state that the bar 181 is normally held at the position shown in Fig. 5 by means of a coiled spring 245, said spring also serving after the bar 181 is actuated toward the left of Fig. 5 to return said bar to its normal position.

While I have described the paper-carrying carriage as adjustable endwise, yet it will be understood that this adjustment is effected only when a sheet of paper of the full width is adjusted to the roll 91 and the narrow width of the roll 127 is disconnected from the roller 91.

What I claim as my invention is—

1. In a calculating-machine, a series of printing-wheels, a series of calculating-wheels, a main operating crank or lever, a series of depressible numbered keys for governing the operation of said printing and calculating wheels, a zero-lever, means governed by said zero-lever and adapted, upon the depression of one of the series of keys, and upon the turning of the main crank or lever to permit said printing and calculating wheels to operate in unison to move said calculating-wheels to zero and said printing-wheels to printing position to print the total last displayed on the calculating-wheels.

2. In a calculating-machine, a series of calculating-wheels, a main operating crank or lever, a series of depressible numbered keys for governing the operation of said calculating-wheels, a zero-lever, and means governed by said zero-lever and adapted, upon the depression of one of the series of keys and upon the turning of the main crank or lever, to permit said calculating-wheels to turn back to zero.

3. In a calculating-machine, the combination of a series of calculating-wheels having characters thereon, means for normally holding said wheels so as to display a certain character to view, a keyboard having openings therethrough arranged in lines, the openings in each line being arranged in groups, a series of operating-keys passing through the openings of the keyboard, a series of longitudinal actuating-bars corresponding in number to the number of lines of operating-keys, and each provided with a series of upwardly-extending fingers corresponding in number to the number of groups of openings in each line of openings of the keyboard, means for normally holding the actuating-bars in their rearwardly-thrust position, means adapted, upon the operation of an operating-key, for releasing the actuating-bar relating to the line of keys in which said operating-key is located, the said actuating-bar moving a distance forwardly limited by contact of the upwardly-extending finger thereof relating to the group of keys in which the operated key belongs, with the lower end of said operated key, means operated by the movement of the actuating-bar for turning the calculating-wheel to display the character thereon corresponding to the character of the key operated, and means after said character is displayed for returning the longitudinal actuating-bar and the key operated to normal position.

4. In a calculating-machine, the combination of a series of calculating-wheels having characters thereon, means for normally holding said wheels so as to display a certain character to view, a keyboard having openings therethrough arranged in lines, the openings in each line being arranged in groups, a series of slidable bars on the keyboard, each bar provided with a series of inclined notches arranged in groups corresponding to the groups of openings of the keyboard, and each also provided with an inclined surface, a series of operating-keys passing through the openings of the keyboard, a series of longitudinal actuating-bars corresponding in number to the number of lines of operating-keys, and each provided with a series of upwardly-extending fingers corresponding in number to the number of groups of openings in each line of openings of the keyboard, and each actuating-bar also provided with a laterally-extending lug, a series of pivoted zero-arms having their upper ends engaged by the inclined surfaces of the slidable bars, and each having its lower end normally engaging the lug of an actuating-bar, and each also contacting with the next adjacent arm, so that when one of said arms is moved all of the other arms on one side thereof will be simultaneously moved, a series of pivoted stop-arms each having its upper ends engaged by the inclined surface of the slidable bar relating thereto, and each stop-arm mounted slightly in advance of its companion zero-arms, means carried by each operating-key for engaging the inclined notch relating thereto of its slidable bar to thereby thrust the slidable bar rearwardly when the key is operated, the rear movement of said slidable bar causing the inclined surface thereof to act on the zero-arm and the stop-arm and thereby turn the same simultaneously, and release the actuating-bar relating thereto, whereby the calculating-wheel relating to said actuating-bar is turned so as to bring to view a character corresponding to the character of the key operated, while the zero-arms on one side of the zero-arm which was positively operated are simultaneously turned but the stop-arms relating thereto are not turned, whereby the actuating-bars relating to such zero-arms are moved the slight distance permitted by contact of the lateral lugs of said actuating-bars with the ends of the stop-arms, said slight movement being insufficient to turn the calculating-wheels relating thereto, and hence said calculating-wheels are unaffected, means after the character is displayed on the calculating-wheels for returning the actuating-bars to normal position, and means for returning the slidable bars and the operating-keys to normal position.

5. In a calculating-machine, the combination of a series of calculating-wheels having characters thereon, means for normally holding said wheels so as to display a certain character to view, a series of printing-wheels having characters thereon corresponding to the characters on the calculating-wheels, a series of operating-keys, a series of longitudinal actuating-bars normally locked in a rearwardly-thrust position, but each adapted to be unlocked when the operating-key pertaining thereto is operated, a main shaft provided with an operating-handle and having cranks at opposite ends, means operated by said cranks for permitting the longitudinal actuating-bars to move outwardly gradually, a short shaft, an inking-disk mounted thereon, a ratchet-wheel on the short shaft, a pawl engaging said ratchet-wheel, a link pivotally connected at one end to the pawl, a bell-crank lever having one arm pivotally connected to the opposite end of the link, and a pivoted arm pivotally connected to the other arm of the bell-crank lever, said arm adapted to be turned on its pivot by one of the cranks of the main shaft when said main shaft is rotated, the said arm when so turned acting on the bell-crank lever and thereby causing, through the described connection, the pawl to intermittently engage the ratchet-wheel and thereby intermittently rotate the inking-disk.

6. In a calculating-machine, the combination of printing-wheels, means for operating the same, pivoted levers, a paper-carrying cylinder carried by said levers, links provided with elongated slots, a bar for each link, each bar provided with a projecting pivot for the lever pertaining thereto, screws passing through the slots and engaging said bars, and an adjusting-screw passing through an angularly-bent end of each bar and engaging the end of the lever.

7. In a calculating-machine, the combination of printing-wheels, means for operating said printing-wheels, pivoted levers, means for turning said levers on their pivots, bearings carried by the levers, a shaft mounted in said bearings, a paper-carrying cylinder on said shaft, arms pivoted to the bearings, a rod connecting said arms, a pivoted arm provided with an opening through which said rod passes, spring-controlled pawls pivoted to the arms which are pivoted to the bearings, and ratchet-wheels on the shaft of the paper-carrying cylinder, said wheels adapted to be engaged by the pawls.

8. In a calculating-machine, the combination of printing-wheels, means for operating said wheels, pivoted levers, means for turning said levers on their pivots, a carriage movable in guideways in the upper portions of the levers, said carriage provided on its under side with a series of teeth, bearings carried by said carriage, a shaft mounted in the bearings, a paper-carrying cylinder on the shaft, a pivoted lever having its upper edge toothed and adapted to engage the teeth of the carriage, and a spring-pressed push-rod provided with a beveled portion adapted, when the rod is pushed inwardly, to engage a projection from the lever and thereby turn said lever in a direction to disengage its teeth from the teeth of the carriage.

9. In a calculating-machine, a series of printing-wheels, a series of calculating-wheels, a main operating crank or lever, a series of depressible numbered keys for governing the operation of said printing and calculating wheels, a zero-lever, means governed by said zero-lever and adapted upon the depression of one of the series of keys and upon the turning of the main crank or lever to permit said calculating-wheels to turn back to zero and said printing-wheels to be turned to printing position to print the total last displayed on the calculating-wheels.

10. In a calculating-machine, a series of printing-wheels, a series of calculating-wheels, a main operating crank or handle, a series of depressible numbered keys for governing the operation of said printing and calculating wheels, a total-retaining lever, and means adapted upon the operation of said lever and one of said keys and upon the turning of the main crank or lever to permit the printing of the total displayed by the calculating-wheels and retaining said total on the calculating-wheels.

11. In a calculating-machine, the combination of a series of calculating-wheels, longitudinal bars for actuating said wheels, means for operating the actuating-bars, a movable transverse bar bearing against the outer ends of the actuating-bars and adapted when moved outwardly to permit said actuating-bars to move therewith, a main shaft, means for turning said shaft, a wheel on the main shaft provided with a projecting pin, means connecting the shaft with the transverse bar to cause said bar to travel outwardly and inwardly on the turning of the shaft, a pivoted arm provided with a shoulder which the pin normally engages, and means adapted to act on the lever in order to turn the same and release its shoulder from the pin and thereby unlock the main shaft.

12. In a calculating-machine, the combination of a series of calculating-wheels, longitudinal actuating-bars for operating said wheels, a series of keys for operating the actuating-bars, a slidable bar for each line of keys, and adapted when a key is operated to be moved rearwardly, a movable transverse bar bearing against the outer ends of the actuating-bars and adapted when moved outwardly to permit said actuating-bars to move therewith, a main shaft, means for turning said shaft, a wheel on the main shaft provided with a projecting pin, means connecting the main shaft with the transverse bar to cause said bar to travel outwardly and inwardly on the turning of the shaft, a pivoted arm provided with a shoulder which the pin normally engages, and said arm also provided with an inward extension, and a transverse pivoted bar back of the slidable bars and adapted to be turned rearwardly when any of said slidable bars are moved rearwardly, the rearward turning of the pivoted bar acting on the inward extension of the pivoted arm and causing said arm to turn in a direction to release its shoulder from the pin of the wheel.

13. In a calculating-machine, the combination of a series of calculating-wheels, longitudinal actuating-bars for operating said wheels, a series of keys for operating the actuating-bars, a slidable bar for each line of keys and adapted when a key is operated to be moved rearwardly, a series of pivoted levers normally engaging notches at the rear of the slidable bars, a lever-actuating bar provided with a series of lugs, a key provided with a beveled surface adapted when the key is operated to engage the beveled end of the lever-actuating bar and move said bar in a direction to cause the lugs thereof to act against the levers and turn the same out of engagement with the notches of the slidable bars, a bell-crank lever having one arm adapted to be acted upon by a projection from the lever-actuating bar, to thereby turn said bell-crank lever on its pivot, a rod extending rearwardly from the short arm of the bell-crank lever, means for returning the lever-actuating bar to its normal position so as to cause the levers carried thereby to engage back of the unnotched portion at the rear ends of the slidable bar, after said slidable bars have been moved rearwardly, a movable transverse bar bearing against the outer ends of the longitudinal actuating-bars, and adapted when moved outwardly to permit said actuating-bars to move therewith, a main shaft, means for turning said shaft, a wheel on said shaft provided with a projecting pin, means connecting the shaft with the transverse bar to cause said bar to travel outwardly and inwardly on the turning of the shaft, and a pivoted arm provided with a shoulder which the pin normally engages, and said arm also provided with an inward extension which the rearwardly-extending rod is adapted to engage when the bell-crank lever is turned on its pivot, the said engagement causing the shoulder of the pivoted arm to be released from the pin of the wheel.

14. In a calculating-machine, the combination of a series of calculating-wheels having characters thereon, a gear-wheel rotatable with each calculating-wheel, a series of longitudinal actuating-bars, a rack-bar slidingly fitted to each actuating-bar and having a limited movement forwardly and rearwardly with respect to the actuating-bar, each rack-bar provided with a laterally-projecting pin, a series of pivoted dogs provided with shoulders, a rock-shaft, a series of levers mounted thereon and adapted normally to engage the upper shoulders of the pivoted levers, each dog provided with an upward extension adapted normally to engage back of the lateral pin of each rack-bar, a pin projecting from each calculating-wheel, and adapted when a wheel is completing its revolution to act on the pivoted dog relating to the next succeeding calculating-wheel to thereby permit the lever supported thereby to drop to the lower shoulder of said dog, and consequently bring the upward extension of the lever out of engagement with the lateral pin of the rack-bar, a spring for moving said rack-bar rearwardly a limited distance when so released, whereby the teeth thereof will engage the teeth of the ratchet-wheel of the next succeeding calculating-wheel and thereby rotate said wheel the distance of one character, and means for returning the pivoted dogs and levers to their normal position.

15. In a calculating-machine, the combination of a series of calculating-wheels, a series of gear-wheels rotatable with the calculating-wheels, a series of longitudinal actuating-bars provided with teeth adapted to engage the gear-wheels, means for causing said bars to move forwardly and rearwardly, a pivoted bar, means for turning said bar on its pivot and thereby cause the same to act on the longitudinal actuating-bars and raise said bars so that the teeth thereof on the movement of said actuating-bars in one direction will engage the teeth of the gear-wheels, another pivoted bar provided with a series of projecting pawls adapted normally to engage the gear-wheels and hold the same locked against rotation, and mechanism between the two pivoted bars and adapted when the first-referred-to pivoted bar is raised to act on the last-referred-to bar and effect the raising of the same and the disengagement of the pawls from the gear-wheels.

16. In a calculating-machine, the combination of a series of calculating-wheels, a series of gear-wheels rotatable with the calculating-wheels, a series of longitudinal actuating-bars provided with teeth adapted to engage the gear-wheels, means for causing said bars to move forwardly and rearwardly, a pivoted bar, means for turning said bar on its pivot and thereby cause the same to act on the longitudinal actuating-bars and raise the same so that the teeth thereof, on the movement of said actuating-bars in one direction, will engage the teeth of the gear-wheels, another pivoted bar provided with a series of projecting pawls adapted normally to engage the gear-wheels and hold the same locked against rotation, a pivoted lever provided with an extension adapted to be acted upon by the first-referred-to pivoted bar when said bar is raised, and an arm extending from the last-referred-to pivoted bar and adapted to be acted upon by the pivoted lever when said lever is actuated, and thereby raise the pawls out of engagement with the gear-wheels.

17. In a calculating-machine, the combination of a series of calculating-wheels, a series of gear-wheels rotatable therewith, a series of printing-wheels, a series of gear-wheels rotatable therewith, a series of longitudinal actuating-bars provided with sets of teeth adapted to engage the respective gear-wheels, and also provided with lateral lugs, and with an upwardly-extending pin, a paper-carrying cylinder, means for bringing the same into contact with the type of the printing-wheels which have been brought to printing position, a series of zero-arms normally engaging the lateral lugs and thereby holding the longitudinal actuating-bars in adjusted position, a series of stop-arms, a series of keys adapted when one is operated to cause a simultaneous turning of the zero-arm and the stop-arm relating thereto, and at the same time the turning of all the zero-arms on one side of the one relating to the key operated, a cross-bar provided with a series of pins projecting adjacent to the side edges of said stop-arms, an operating-lever, mechanism between said lever and the cross-bar and adapted when the lever is operated to actuate the cross-bar and cause the pins thereof to act against the stop-arms and turn said arms so as to bring the same out of line with the lateral lugs of the longitudinal actuating-bars, a cross-bar adapted to act on the longitudinal actuating-bars and raise the same so as to cause the forward teeth thereof to engage the teeth of the gear-wheels relating to the calculating-wheels, mechanism between the lever and said latter cross-bar and adapted when the lever is operated for raising said cross-bar on the forward movement of said actuating-bars, and for dropping the latter cross-bar on the return rearward movement of the actuating-bars, means when the calculating-wheels are thus engaged, and in turning the same in one direction, for limiting said turning to the point where the calculating-wheels display zero, and means for returning the lever to normal position.

18. In a calculating-machine, the combination of a series of calculating-wheels, a series of gear-wheels rotatable therewith, a series of printing-wheels, a series of gear-wheels rotatable therewith, a series of longitudinal actuating-bars provided at opposite ends with sets of teeth adapted respectively to operate the gear-wheels of the calculating-wheels and the gear-wheels of the printing-wheels, each calculating-bar also provided with a lateral lug and with upwardly-extending pins, a series of zero-arms normally engaging the lateral lugs and thereby holding the longitudinal actuating-bars in adjusted position, a paper-carrying cylinder, means for bringing the same into contact with the type of the printing-wheels which have been brought to printing position, a series of stop-arms, a series of keys adapted when one is operated to cause the simultaneous turning of the zero-arm and the stop-arm relating thereto, and at the same time the turning of all the zero-arms on one side of the one relating to the key operated, a cross-bar provided with a series of pins projecting adjacent to the side edges of said stop-arms, a bell-crank lever pivoted to the cross-bar, a rod connected to one arm of the bell-crank lever and extending therefrom, an operating-lever adapted when thrust in one direction to act on the rod and actuate the cross-bar and thereby cause the pins thereof to act against the stop-arms and turn said stop-arms so as to bring the same out of line with the lateral lugs of the longitudinal actuating-bars, a cross-bar adapted to act on the longitudinal actuating-bars and raise the same so as to cause the forward teeth thereof to engage the teeth of the gear-wheels relating to the calculating-wheels, and a bell-crank lever adapted to be acted upon by the operating-lever when said operating-lever is turned in one direction, and said bell-crank lever when so operated adapted in turn to operate on the cross-bar to cause the same to be raised and thereby raise the longitudinal actuating-bars, and bring the teeth thereof into engagement with the teeth of the gear-wheels of the calculating-wheels, means when the calculating-wheels are thus engaged, and in the turning of the same in one direction, for limiting said turning to the point where the calculating-wheels display zero, and means for returning the operating-lever to normal position.

19. In a calculating-machine, the combination of a series of calculating-wheels, a series of gear-wheels rotatable therewith, a series of printing-wheels, a series of longitudinal actuating-bars adapted to actuate the printing-wheels, and bring the proper characters thereon to printing position, a paper-carrying cylinder adapted to be brought into contact with the type on the printing-wheels which have been brought to printing position, rack-bars slidingly fitted to the longitudinal actuating-bars, and adapted to have a limited movement with respect thereto, and each rack-bar provided with a depending finger, means when a calculating-wheel is completing its revolution to cause the rack-bar relating to the next succeeding calculating-wheel to move the distance necessary to carry over one character on said next succeeding calculating-wheel, a pivoted bar adapted to be turned by the engagement of the depending finger of the rack-bar therewith, when said rack-bar is so moved, a total-lever, mechanism operated thereby for retaining the total on the calculating-wheels after total is printed, said total-lever provided with a projecting lug, a pivoted bell-crank lever adapted to be operated when the pivoted bar is so actuated, said bell-crank lever provided with a shouldered portion which is adapted, when said bell-crank lever is operated, to engage the projecting lug of the total-lever and thereby prevent said total-lever from being actuated, and means adapted to unlock the total-lever and at the same time space the paper.

20. In a calculating-machine, the combination of a series of calculating-wheels, a series of gear-wheels rotatable therewith, a series of longitudinal actuating-bars provided with teeth adapted to engage the teeth of the gear-wheels and thereby cause a rotation of the calculating-wheels, a pivoted bar, a medially-pivoted lever therebeneath, another lever, means operating on said lever to cause the same to act on the medially-pivoted lever and thereby raise the pivoted bar and cause the same to act on the longitudinal actuating-bars so as to throw the teeth thereof into engagement with the gear-wheels, a zero-lever, a connection between said zero-lever and the medially-pivoted lever, whereby when the zero-lever is turned the medially-pivoted lever is turned in a direction to prevent the lever which acts upon the same from acting thereagainst.

21. In a calculating-machine, the combination of a series of calculating-wheels, longitudinal actuating-bars for operating the same, means for normally holding said bars in their rearwardly-thrust position, a series of keys adapted when operated to unlock the longitudinal actuating-bars, a slidable bar for each line of keys and adapted to be moved rearwardly when a key in the line of keys relating thereto is operated, each of said slidable bars provided at its rear end with a projecting pin, a series of spring-pressed pivoted pawls arranged back of the slidable bars, a transverse bar in front of said pawls and provided at its end with a beveled notch, and also provided with a series of lugs adapted when the bar is actuated to act on the pawls and turn the same on their pivots, a rotatable wheel provided with a hand-crank and also provided with a beveled lug engaged by the beveled notch of the transverse bar, mechanism actuated by the turning of the hand-crank and adapted to permit the unlocked longitudinal actuating-bars to move longitudinally, means for normally holding the hand-crank locked, means when the slidable bars are moved rearwardly for releasing said locking mechanism, and means when the hand-crank is turned for causing the transverse bar to move inwardly and thereby bring the pivoted pawls back of the pins of the slidable bars which have not been operated, and hence prevent the operator, should he fail to turn the hand-crank entirely around, from operating any of the other operating-keys.

22. In a calculating-machine, the combination of a series of calculating-wheels, longitudinal actuating-bars for operating the same, means for normally holding said bars in their rearwardly-thrust position, a series of keys adapted when operated to unlock the longitudinal actuating-bars, a slidable bar for each line of keys and adapted to be moved rearwardly when a key in the line of keys relating thereto is operated, each of said slidable bars provided with an upwardly-extending tooth, a transverse pivoted bar, means for normally holding said bar in a raised position, and a repeating-lever, said lever when operated adapted to engage the transverse pivoted bar and force the same downwardly and in front of the upwardly-extending teeth of such of the slidable bars as were forced rearwardly.

23. In a calculating-machine, the combination with repeating mechanism, of gong mechanism adapted to sound an alarm after the number operated upon has been repeated a certain predetermined number of times, said gong mechanism consisting of a disk having graduated marks thereon, a ratchet-wheel fast to the disk, a pin projecting from the ratchet-wheel, a rock-shaft, an arm projecting therefrom, which the pin is adapted to engage, a gong-hammer extending from said rock-shaft and adapted when the pin passes off the arm to strike against the index-disk, and sound the alarm, and a pawl adapted to intermittently engage the teeth of the ratchet-wheel and thereby intermittently rotate said ratchet-wheel and the index-disk.

In testimony whereof I affix my signature in presence of two witnesses.

JAMES MALLMANN.

Witnesses:
GEO. DIEHL,
ANTON J. MALLMANN.